United States Patent
Xu et al.

(10) Patent No.: US 11,265,129 B2
(45) Date of Patent: Mar. 1, 2022

(54) DYNAMIC CONFIGURATION AND ADAPTATION OF PHYSICAL DOWNLINK CONTROL CHANNEL CANDIDATES

(71) Applicant: QUALCOMM Incorporated, San Diego, CA (US)

(72) Inventors: Huilin Xu, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 16/532,166

(22) Filed: Aug. 5, 2019

(65) Prior Publication Data

US 2020/0052857 A1 Feb. 13, 2020

Related U.S. Application Data

(60) Provisional application No. 62/715,725, filed on Aug. 7, 2018.

(51) Int. Cl.
*H04B 7/00* (2006.01)
*H04L 5/00* (2006.01)
(Continued)

(52) U.S. Cl.
CPC ......... *H04L 5/0053* (2013.01); *H04W 72/042* (2013.01); *H04W 72/0446* (2013.01); *H04W 76/27* (2018.02)

(58) Field of Classification Search
CPC . H04W 68/02; H04W 72/02; H04W 72/0406; H04W 72/0446; H04W 72/10;
(Continued)

(56) References Cited

U.S. PATENT DOCUMENTS 8,401,542 B2 * 3/2013 Chung ................. H04L 5/0053
455/423
10,462,739 B2 * 10/2019 Papasakellariou .... H04L 5/0096
(Continued)

OTHER PUBLICATIONS

"3rd Generation Partnership Project; Technical Specification Group Radio Access Network; NR; Physical layer procedures for control (Release 15)", 3GPP Standard; Technical Specification; 3GPP TS 38.213, 3rd Generation Partnership Project (3GPP), Mobile Competence Centre ; 650, Route Des Lucioles ; F-06921 Sophia-Antipolis Cedex ; France, vol. RAN WG1, No. V15.2.0, Jun. 29, 2018 (Jun. 29, 2018), pp. 1-99, XP051474490, [retrieved on Jun. 29, 2018], section 8.1; pp. 32-33, table 8.1_1, section 10-10.1; p. 66-p. 69; tables 10.1-1.
(Continued)

*Primary Examiner* — Dmitry Levitan
(74) *Attorney, Agent, or Firm* — Holland & Hart LLP

(57) ABSTRACT

Methods, systems, and devices for configuring physical downlink control channel candidates are described. The method may include monitoring, by a UE, an initial set of physical downlink control channel candidates in a first slot, receiving, by the UE, an indication of an adjusted set of physical downlink control channel candidates to monitor in a second slot based on decoding a physical downlink control channel candidate in the initial set, and monitoring, by the UE in the second slot, the adjusted set of physical downlink control channel candidates. The method may also include adaptively (e.g., autonomously) determining, by the UE, the adjusted set of physical downlink control channel candidates, and corresponding determinations by the base station.

29 Claims, 20 Drawing Sheets

(51) Int. Cl.
*H04W 76/27* (2018.01)
*H04W 72/04* (2009.01)

(58) Field of Classification Search
CPC ............. H04W 76/04; H04W 28/0231; H04W 28/0273
USPC ................................. 370/310, 328, 329, 341
See application file for complete search history.

(56) References Cited

U.S. PATENT DOCUMENTS

| | | | |
|---|---|---|---|
| 2017/0367046 A1 | 12/2017 | Papasakellariou | |
| 2019/0280802 A1* | 9/2019 | Ma ........................ | H04W 76/11 |
| 2020/0052857 A1* | 2/2020 | Xu ......................... | H04L 5/0096 |
| 2020/0213978 A1* | 7/2020 | Iyer ....................... | H04L 5/0053 |
| 2020/0236699 A1* | 7/2020 | Nakashima ............. | H04L 27/26 |
| 2021/0084620 A1* | 3/2021 | Tooher .............. | H04W 72/1247 |
| 2021/0144798 A1* | 5/2021 | Jiang ..................... | H04W 76/28 |
| 2021/0235481 A1* | 7/2021 | Takeda .............. | H04W 72/0446 |

OTHER PUBLICATIONS

International Search Report and Written Opinion—PCT/US2019/045231—ISA/EPO—dated Oct. 11, 2019.
NTT Docomo et al., "Summary of key aspects for search space", 3GPP Draft; R1-1718834_Summary_AI_7312, 3rd Generation Partnership Project (3GPP), Mobile Competence Centre ; 650, Route Des Lucioles ; F-06921 Sophia-Antipolis Cedex ; France, vol. RAN WG1, No. Prague, CZ; Oct. 9, 2017-Oct. 13, 2017, Oct. 9, 2017 (Oct. 9, 2017), XP051353314, 22 Pages, Retrieved from the Internet: URL:http://www.3gpp.org/ftp/tsg_ran/WG1_RL1/TSGR1_90b/Docs/ retrieved on Oct. 9, 2017], section 3.2 "Proposal 4"; p. 4.

* cited by examiner

DYNAMIC CONFIGURATION AND ADAPTATION OF PHYSICAL DOWNLINK CONTROL CHANNEL CANDIDATES

CROSS REFERENCE

The present Application for Patent claims the benefit of U.S. Provisional Patent Application No. 62/715,725 by Xu, et al., entitled "DYNAMIC CONFIGURATION AND ADAPTATION OF PHYSICAL DOWNLINK CONTROL CHANNEL CANDIDATES," filed Aug. 7, 2018, which is assigned to the assignee hereof and expressly incorporated herein.

BACKGROUND

The following relates generally to configuring physical downlink control channel candidates, and to dynamic configuration and adaptation of physical downlink control channel candidates.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some cases, a UE may be configured to monitor for a physical download control channel (PDCCH) to receive downlink control information (DCI) (e.g., for scheduling downlink or uplink transmissions, or both). PDCCH monitoring complexity contributes to UE power consumption, including in UE low power operation.

SUMMARY

The described techniques relate to improved methods, systems, devices, and apparatuses that support dynamic configuration and adaptation of physical downlink control channel candidates. Generally, the described techniques provide for reducing physical downlink control channel (PDCCH) monitoring complexity. Specifically, the described techniques provide for dynamic configuration and adaptation of PDCCH candidates. In some cases, a network-side entity, such as a base station, may explicitly indicate adjustments in PDCCH candidates to a wireless device, such as a user equipment (UE). The explicit indication may be transmitted via a PDCCH, and thus a PDCCH message may indicate a change in PDCCH monitoring. In some cases, a UE may adaptively adjust its PDCCH monitoring (e.g., autonomously). For example, the UE may adaptively adjust its PDCCH monitoring according to an algorithm or otherwise defined set of rules, and a base station may apply the same algorithm or rules to maintain knowledge of the PDCCH monitoring behavior of the UE.

A method of wireless communication is described. The method may include monitoring, by a UE, an initial set of physical downlink control channel candidates in a first slot, receiving, by the UE, an indication of an adjusted set of physical downlink control channel candidates to monitor in a second slot based on decoding a physical downlink control channel candidate in the initial set, and monitoring, by the UE in the second slot, the adjusted set of physical downlink control channel candidates.

An apparatus for wireless communication is described. The apparatus may include a processor, memory coupled to the processor, and instructions stored in the memory. The instructions may be executable by the processor to cause the apparatus to monitor, by a UE, an initial set of physical downlink control channel candidates in a first slot, receive, by the UE, an indication of an adjusted set of physical downlink control channel candidates to monitor in a second slot based on decoding a physical downlink control channel candidate in the initial set, and monitor, by the UE in the second slot, the adjusted set of physical downlink control channel candidates.

Another apparatus for wireless communication is described. The apparatus may include means for monitoring, by a UE, an initial set of physical downlink control channel candidates in a first slot, receiving, by the UE, an indication of an adjusted set of physical downlink control channel candidates to monitor in a second slot based on decoding a physical downlink control channel candidate in the initial set, and monitoring, by the UE in the second slot, the adjusted set of physical downlink control channel candidates.

A non-transitory computer-readable medium storing code for wireless communication is described. The code may include instructions executable by a processor to monitor, by a UE, an initial set of physical downlink control channel candidates in a first slot, receive, by the UE, an indication of an adjusted set of physical downlink control channel candidates to monitor in a second slot based on decoding a physical downlink control channel candidate in the initial set, and monitor, by the UE in the second slot, the adjusted set of physical downlink control channel candidates.

In some examples of the method, apparatuses, and non-transitory computer-readable medium described herein, receiving the indication of the adjusted set of physical downlink control channel candidates may include operations, features, means, or instructions for obtaining, by the UE from the decoded physical downlink control channel candidate, a DCI message that includes the indication of the adjusted set of physical downlink control channel candidates and determining, by the UE, the adjusted set of physical downlink control channel candidates based on the indication.

Some examples of the method, apparatuses, and non-transitory computer-readable medium described herein may further include operations, features, means, or instructions for applying the indication of the adjusted set of physical downlink control channel candidates to at least one specified search space, to all search spaces in at least one specified search space set, or to all search spaces in all search space sets.

Some examples of the method, apparatuses, and non-transitory computer-readable medium described herein may further include operations, features, means, or instructions for receiving a granularity message indicating how to apply the indication of the adjusted set of physical downlink control channel candidates to associated search spaces. The granularity message may include at least one of a RRC message, a media access control (MAC) control element (MAC-CE) message, or a DCI message, or any combination thereof.

Some examples of the method, apparatuses, and non-transitory computer-readable medium described herein may further include operations, features, means, or instructions for identifying, based on the indication of the adjusted set of physical downlink control channel candidates, a specific number of physical downlink control channel candidates in the adjusted set of physical downlink control channel candidates, a specific value by which a number of physical downlink control channel candidates may be increased or decreased in the adjusted set of physical downlink control channel candidates, or a ratio by which the number of physical downlink control channel candidates may be increased or decreased in the adjusted set of physical downlink control channel candidates.

Some examples of the method, apparatuses, and non-transitory computer-readable medium described herein may further include operations, features, means, or instructions for receiving a candidate adjustment message. In some cases, the candidate adjustment message may include at least one of a RRC message, a MAC-CE message, or a DCI message, or any combination thereof. In some cases, the examples of the method, apparatuses, and non-transitory computer-readable medium described herein may further include operations, features, means, or instructions for determining, based on the candidate adjustment message, whether to identify the specific number, the specific value, or the ratio by which the number of physical downlink control channel candidates is increased or decreased.

Some examples of the method, apparatuses, and non-transitory computer-readable medium described herein may further include operations, features, means, or instructions for identifying based on the indication of the adjusted set of physical downlink control channel candidates, a specific value of one or more aggregation levels to be monitored in the adjusted set of physical downlink control channel candidates, a delta set of aggregation levels indicating one or more aggregation levels to no longer monitor or one or more aggregation levels to begin monitoring, or a step value by which to increment or decrement one or more aggregation levels to be monitored in the adjusted set of physical downlink control channel candidates.

Some examples of the method, apparatuses, and non-transitory computer-readable medium described herein may further include operations, features, means, or instructions for receiving an aggregation level adjustment message that includes at least one of a RRC message, a MAC-CE message, or a DCI message, or any combination thereof. In some cases, the examples of the method, apparatuses, and non-transitory computer-readable medium described herein may further include operations, features, means, or instructions for determining, based on the aggregation level adjustment message, whether to identify the one or more specific aggregation levels, the delta set of aggregation levels, or the step value.

A method of wireless communication is described. The method may include transmitting, by a base station to a UE, an indication for the UE to monitor an initial set of physical downlink control channel candidates in a first slot, determining, by the base station, an adjusted set of physical downlink control channel candidates for the UE to monitor in a second slot, and transmitting, by the base station, a physical downlink control channel candidate in the initial set that includes an indication of the adjusted set of physical downlink control channel candidates.

An apparatus for wireless communication is described. The apparatus may include a processor, memory coupled to the processor, and instructions stored in the memory. The instructions may be executable by the processor to cause the apparatus to transmit, by a base station to a UE, an indication for the UE to monitor an initial set of physical downlink control channel candidates in a first slot, determine, by the base station, an adjusted set of physical downlink control channel candidates for the UE to monitor in a second slot, and transmit, by the base station, a physical downlink control channel candidate in the initial set that includes an indication of the adjusted set of physical downlink control channel candidates.

Another apparatus for wireless communication is described. The apparatus may include means for transmitting, by a base station to a UE, an indication for the UE to monitor an initial set of physical downlink control channel candidates in a first slot, determining, by the base station, an adjusted set of physical downlink control channel candidates for the UE to monitor in a second slot, and transmitting, by the base station, a physical downlink control channel candidate in the initial set that includes an indication of the adjusted set of physical downlink control channel candidates.

A non-transitory computer-readable medium storing code for wireless communication is described. The code may include instructions executable by a processor to transmit, by a base station to a UE, an indication for the UE to monitor an initial set of physical downlink control channel candidates in a first slot, determine, by the base station, an adjusted set of physical downlink control channel candidates for the UE to monitor in a second slot, and transmit, by the base station, a physical downlink control channel candidate in the initial set that includes an indication of the adjusted set of physical downlink control channel candidates.

In some examples of the method, apparatuses, and non-transitory computer-readable medium described herein, transmitting the adjusted set of physical downlink control channel candidates may include operations, features, means, or instructions for configuring a DCI message that includes the indication of the adjusted set of physical downlink control channel candidates and transmitting the DCI message to the UE via at least one physical downlink control channel candidate in the initial set.

Some examples of the method, apparatuses, and non-transitory computer-readable medium described herein may further include operations, features, means, or instructions for configuring a granularity message indicating how to apply the indication of the adjusted set of physical downlink control channel candidates to associated search spaces and transmitting the granularity message to the UE via at least one of a RRC message, a MAC-CE message, or a DCI message, or any combination thereof.

A method of wireless communication is described. The method may include receiving, by a UE, an initial set of physical downlink control channel candidates, determining, by the UE, whether one or more physical downlink control channel candidates in the initial set are successfully decoded, determining, by the UE, an adjusted set of physical downlink control channel candidates to monitor based on whether one or more physical downlink control channel candidates in the initial set are successfully decoded, and monitoring, by the UE, the adjusted set of physical downlink control channel candidates.

An apparatus for wireless communication is described. The apparatus may include a processor, memory coupled to the processor, and instructions stored in the memory. The instructions may be executable by the processor to cause the apparatus to receive, by a UE, an initial set of physical downlink control channel candidates, determine, by the UE, whether one or more physical downlink control channel candidates in the initial set are successfully decoded, determine, by the UE, an adjusted set of physical downlink control channel candidates to monitor based on whether one or more physical downlink control channel candidates in the initial set are successfully decoded, and monitor, by the UE, the adjusted set of physical downlink control channel candidates.

Another apparatus for wireless communication is described. The apparatus may include means for receiving, by a UE, an initial set of physical downlink control channel candidates, determining, by the UE, whether one or more physical downlink control channel candidates in the initial set are successfully decoded, determining, by the UE, an adjusted set of physical downlink control channel candidates to monitor based on whether one or more physical downlink control channel candidates in the initial set are successfully decoded, and monitoring, by the UE, the adjusted set of physical downlink control channel candidates.

A non-transitory computer-readable medium storing code for wireless communication is described. The code may include instructions executable by a processor to receive, by a UE, an initial set of physical downlink control channel candidates, determine, by the UE, whether one or more physical downlink control channel candidates in the initial set are successfully decoded, determine, by the UE, an adjusted set of physical downlink control channel candidates to monitor based on whether one or more physical downlink control channel candidates in the initial set are successfully decoded, and monitor, by the UE, the adjusted set of physical downlink control channel candidates.

In some examples of the method, apparatuses, and non-transitory computer-readable medium described herein, determining the adjusted set of physical downlink control channel candidates may include operations, features, means, or instructions for determining an adjusted number of physical downlink control channel candidates or determining an adjusted aggregation level of physical downlink control channel candidates, or any combination thereof.

In some examples of the method, apparatuses, and non-transitory computer-readable medium described herein, determining the adjusted number of physical downlink control channel candidates may include operations, features, means, or instructions for increasing a number of physical downlink control channel candidates or decreasing the number of physical downlink control channel candidates, or any combination thereof.

In some examples of the method, apparatuses, and non-transitory computer-readable medium described herein, determining the adjusted number of physical downlink control channel candidates may include operations, features, means, or instructions for increasing aggregation levels in one or more physical downlink control channel candidates or decreasing aggregation levels in one or more physical downlink control channel candidates, or any combination thereof.

Some examples of the method, apparatuses, and non-transitory computer-readable medium described herein may further include operations, features, means, or instructions for increasing a number of physical downlink control channel candidates in the adjusted set based on determining that no physical downlink control channel candidates in the initial set may be successfully decoded and decreasing the number of physical downlink control channel candidates in the adjusted set based on determining that one or more physical downlink control channel candidates in the initial set may be successfully decoded.

Some examples of the method, apparatuses, and non-transitory computer-readable medium described herein may further include operations, features, means, or instructions for increasing a number of physical downlink control channel candidates in the adjusted set based on determining that one or more physical downlink control channel candidates in the initial set may be successfully decoded and decreasing the number of physical downlink control channel candidates in the adjusted set based on determining that no physical downlink control channel candidates in the initial set may be successfully decoded.

Some examples of the method, apparatuses, and non-transitory computer-readable medium described herein may further include operations, features, means, or instructions for increasing aggregation levels in the adjusted set based on determining that no physical downlink control channel candidates in the initial set may be successfully decoded and decreasing aggregation levels in the adjusted set based on determining that one or more physical downlink control channel candidates in the initial set may be successfully decoded.

Some examples of the method, apparatuses, and non-transitory computer-readable medium described herein may further include operations, features, means, or instructions for increasing aggregation levels in the adjusted set based on determining that one or more physical downlink control channel candidates in the initial set may be successfully decoded and decreasing aggregation levels in the adjusted set based on determining that no physical downlink control channel candidates in the initial set may be successfully decoded.

Some examples of the method, apparatuses, and non-transitory computer-readable medium described herein may further include operations, features, means, or instructions for monitoring the adjusted set of physical downlink control channel candidates in at least one specified search space, in all search spaces in at least one specified search space set, or in all search spaces in all search space sets.

DETAILED DESCRIPTION

Figure 1:
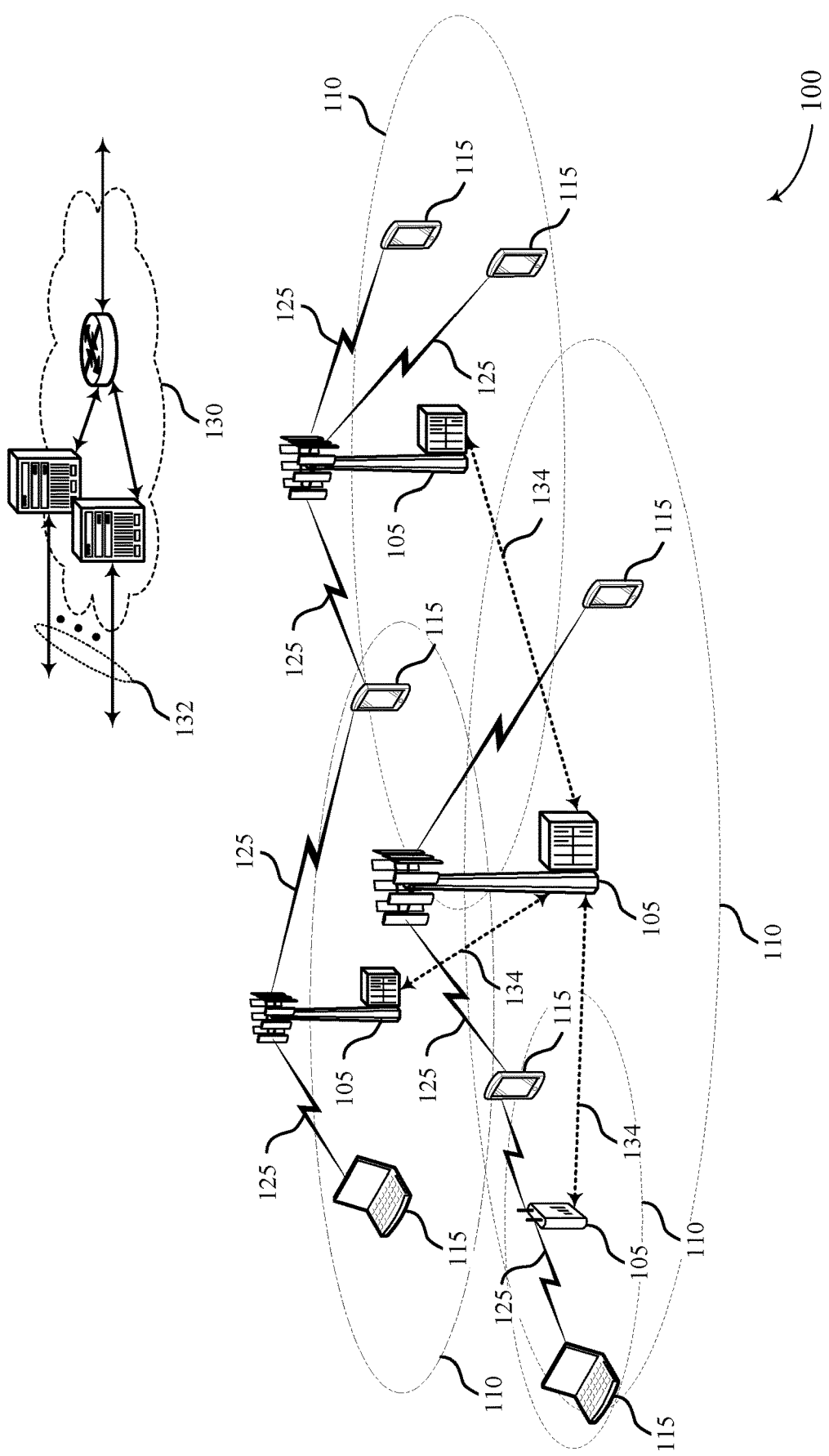
FIG. 1 illustrates an example of a system for configuring physical downlink control channel candidates that supports dynamic configuration and adaptation of physical downlink control channel candidates in accordance with aspects of the present disclosure.

The following relates to reducing monitoring complexity for a physical downlink control channel (PDCCH). Specifically, the following relates to dynamic configuration and adaptation of PDCCH candidates (e.g., dynamically adjusting the number of PDCCH candidates or the aggregation levels, or both). A base station may transmit to a user equipment (UE), an indication for the UE to monitor an initial set of physical downlink control channel candidates in a first slot. Accordingly, the UE may monitor the initial set of physical downlink control channel candidates in the first slot. In some cases, the base station may determine an adjusted set of physical downlink control channel candidates for the UE to monitor in a second slot. The second slot may be any slot where the adjusted set of PDCCH candidates are monitored, and thus may be a slot that is concurrent with the first slot, a slot that is immediately subsequent to the first slot, or any other slot prior to the UE receiving a next indication that indicates the UE is to further update the set of monitored PDCCH candidates.

In some cases, the UE may receive an indication of an adjusted set of physical downlink control channel candidates to monitor in a second slot based at least in part on the UE decoding a physical downlink control channel candidate in the initial set. In some cases, the base station may transmit a physical downlink control channel candidate in the initial set that includes an indication of the adjusted set of physical downlink control channel candidates. In some examples, the UE may monitor the adjusted set of physical downlink control channel candidates in the second slot.

In one example, the UE may autonomously determine an adjusted set of physical downlink control channel candidates to monitor. For example, a UE may receive an initial set of physical downlink control channel candidates and determine whether one or more physical downlink control channel candidates in the initial set are successfully decoded. In some cases, the UE may determine that none of the physical downlink control channel candidates in the initial set are successfully decoded. Accordingly, the UE may determine an adjusted set of physical downlink control channel candidates to monitor based at least in part on the determination that none of the physical downlink control channel candidates in the initial set are successfully decoded. The UE may then monitor the adjusted set of physical downlink control channel candidates. The UE may determine the adjusted set of physical downlink control candidates to monitor based on one or more rules. In some cases, a base station may invoke (apply) the same one or more rules to likewise determine the adjusted set of physical downlink control candidates monitored by the UE, and therefore the UE and the base station may remain synchronized regarding the adjusted set of physical downlink control candidates.

Aspects of the disclosure are initially described in the context of a wireless communications system. The present techniques include UEs or base stations, or both, dynamically configuring PDCCH candidates and UEs autonomously configuring PDCCH candidates. Aspects of the disclosure are further illustrated by and described with reference to apparatus diagrams, system diagrams, and flowcharts that relate to dynamic configuration and adaptation of physical downlink control channel candidates.

FIG. 1 illustrates an example of a wireless communications system 100 that supports dynamic configuration and adaptation of physical downlink control channel candidates in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105, or both. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115, or both, that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In one example, a device, such as a UE 115 or base station 105, may dynamically or autonomously configure PDCCH candidates. For example, a device, such as a UE 115 or base station 105, may dynamically adjust the number of PDCCH candidates or the aggregation level(s), or both.

Figure 2:
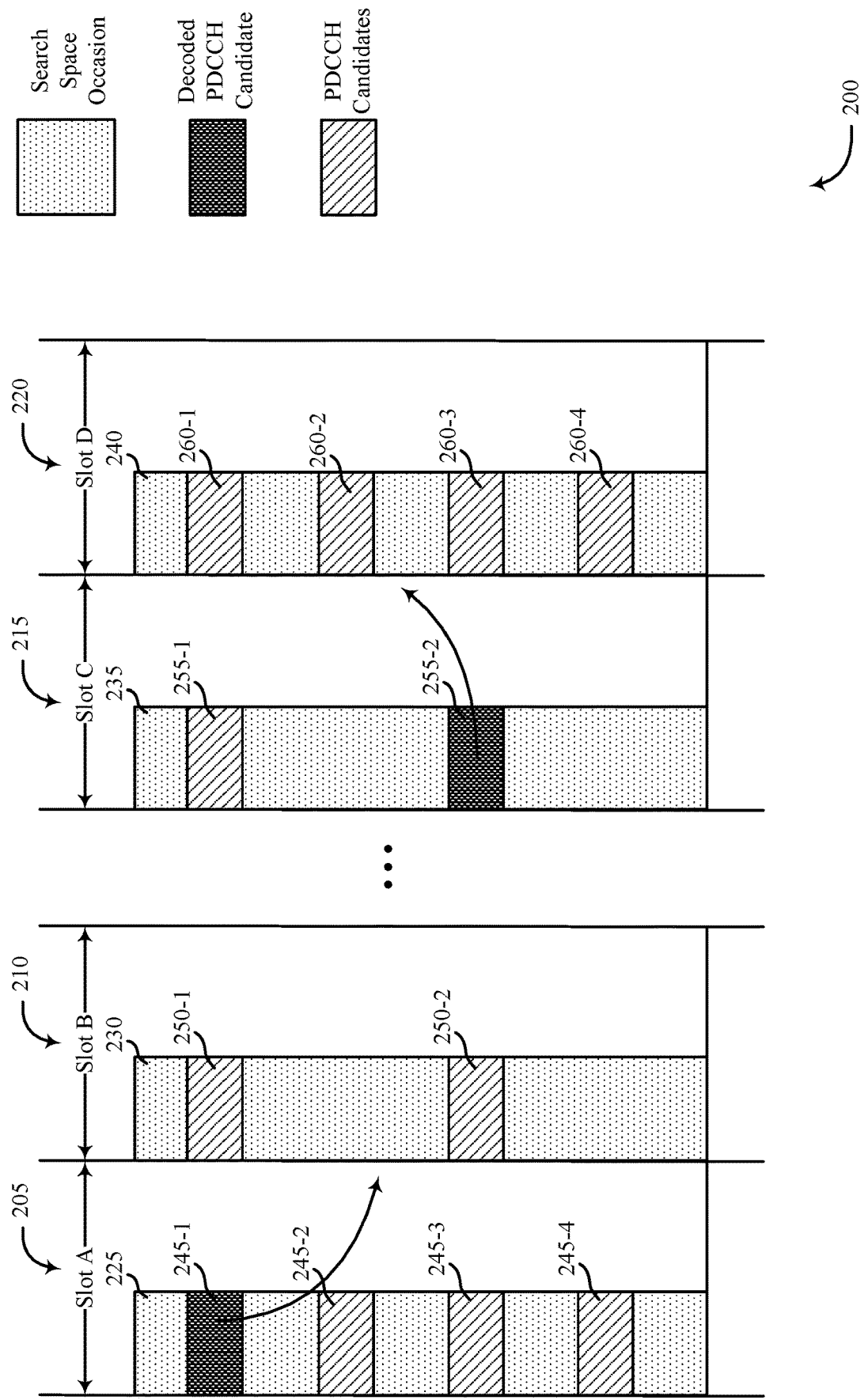
FIGS. 2-5 illustrate examples of one or more communications environments that support dynamic configuration and adaptation of physical downlink control channel candidates in accordance with aspects of the present disclosure.

FIG. 2 illustrates an example of a communications environment 200 that supports dynamic configuration and adaptation of physical downlink control channel candidates in accordance with aspects of the present disclosure. In some examples, environment 200 may implement aspects of wireless communication system 100.

As shown, environment 200 includes an example of multiple slots. As illustrated, environment 200 includes at least slot A 205, slot B 210, slot C 215, and slot D 220. In some examples, slot C 215 follows directly after slot B 210 (e.g., no slots between slot B 210 and slot C 215). Alternatively, environment 200 includes one or more slots between slot B 215 and slot C 215.

In one example, slot A 205 includes search space occasion 225, slot B 210 includes search space occasion 230, slot C 215 includes search space occasion 235, and slot D 220 includes search space occasion 240. In one example, search space occasion 225 may include multiple physical downlink control channel (PDCCH) candidates (e.g., four PDCCH candidates 245-1 to 245-4). As shown, PDCCH candidate 245-1 may be a PDCCH candidate decoded by a user equipment (UE). For example, a UE may detect PDCCH candidate 245-1 in slot A 205 and decode PDCCH candidate 245-1 after detecting it.

In some examples, a decoded PDCCH candidate (e.g., decoded PDCCH candidate 245-1) may indicate a number of PDCCH candidates to monitor in a current slot or a subsequent slot, or both, (e.g., in any concurrent or subsequent search space occasion prior to the decoding of another PDCCH that indicates a further change to the number of PDCCH candidates to monitor). In one example, decoded PDCCH candidate 245-1 may indicate how many PDCCH candidates to monitor in slot A 205 or slot B 210, or both, and in all subsequent search space occasions configured in the search space until a next PDCCH is decoded that changes the number of PDCCH candidates to monitor. In some examples, a base station may configure PDCCH candidate 245-1 to indicate how many PDCCH candidates to monitor. For example, the base station may explicitly indicate the specific number of PDCCH candidates to monitor, indicate an amount of increase or decrease based on a ratio (e.g., double the number of PDCCH candidates to monitor, or decrease by half), or indicate an amount of increase or decrease based on an absolute number (e.g., increase or decrease the number of PDCCH candidates to monitor by one, by two, etc.).

In one example, a message in decoded PDCCH candidate 245-1 may indicate the number of PDCCH candidates to monitor. For instance, a base station may configure the message to indicate the number of PDCCH candidates to monitor. As one example, decoded PDCCH candidate 245-1 in slot A 205 may indicate a UE is to monitor two PDCCH candidates in search space occasion 230 of slot B 210 and in all subsequent search space occasions configured in the search space until a next PDCCH is decoded to change the number of PDCCH candidates to monitor. Accordingly, the UE may monitor search space occasion 230 and detect PDCCH candidate 250-1 and PDCCH candidate 250-2 based on the monitoring. How the message indicates how many PDCCH candidates to monitor (e.g., indicates a specific number of PDCCH candidates to monitor, indicates an amount of increase or decrease based on a ratio, or indicates an amount of increase or decrease based on an absolute number) may be configurable by RRC, MAC, or PDCCH signaling.

Further, a granularity with which the number of PDCCH candidates to monitor is configured may be indicated via at least one of a RRC message, a MAC control element (MAC-CE) message, or a DCI message, or any combination thereof. In one example, granularity may refer to a granularity at which the indication of the adjusted set of PDCCH candidates is applied with respect to a search space. For example, the granularity message may indicate whether to apply the indication of the adjusted set of physical downlink control channel candidates to at least one specified search space, to all search spaces in at least one specified search space set, or to all search spaces in all search space sets. In one example, the granularity message may indicate a number of PDCCH candidates to monitor in one or more slots relative to at least one specified search space, to all search spaces in at least one specified search space set, or to all search spaces in all search space sets.

In some cases, a PDCCH candidate such as decoded PDCCH candidate 245-1 may include one or more messages. For example, decoded PDCCH candidate 245-1 may include a downlink control information (DCI) message. In some cases, the DCI message may indicate the number of PDCCH candidates to monitor. In some cases, a DCI message of environment 200 may include a format that includes a field for indicating a number of PDCCH candidates to be monitored for at least one search space (e.g., all search space occasions configured for the search space, or all search space occasions determined by the configuration of the search space, etc.).

In one example, a UE may detect PDCCH candidate 255-1 and PDCCH candidate 255-2 in search space occasion 235 of slot C 215. As shown, UE may decode PDCCH candidate 255-2. In one example, decoded PDCCH candidate 255-2 may indicate how many PDCCH candidates to monitor in slot C 235 or slot D 240, or both, and in all subsequent search space occasions configured in the search space until a next PDCCH is decoded to change the number of PDCCH candidates to monitor. As one example, decoded PDCCH candidate 255-2 may indicate the UE is to monitor for four PDCCH candidates in search space occasion 240 of slot D 220 and in all subsequent search space occasions configured in the search space until a next PDCCH is decoded to change the number of PDCCH candidates to monitor. Accordingly, the UE may monitor search space occasion 240 and detect PDCCH candidate 260-1, PDCCH candidate 260-2, PDCCH candidate 260-3, and PDCCH candidate 260-4 in search space occasion 240.

Figure 3:
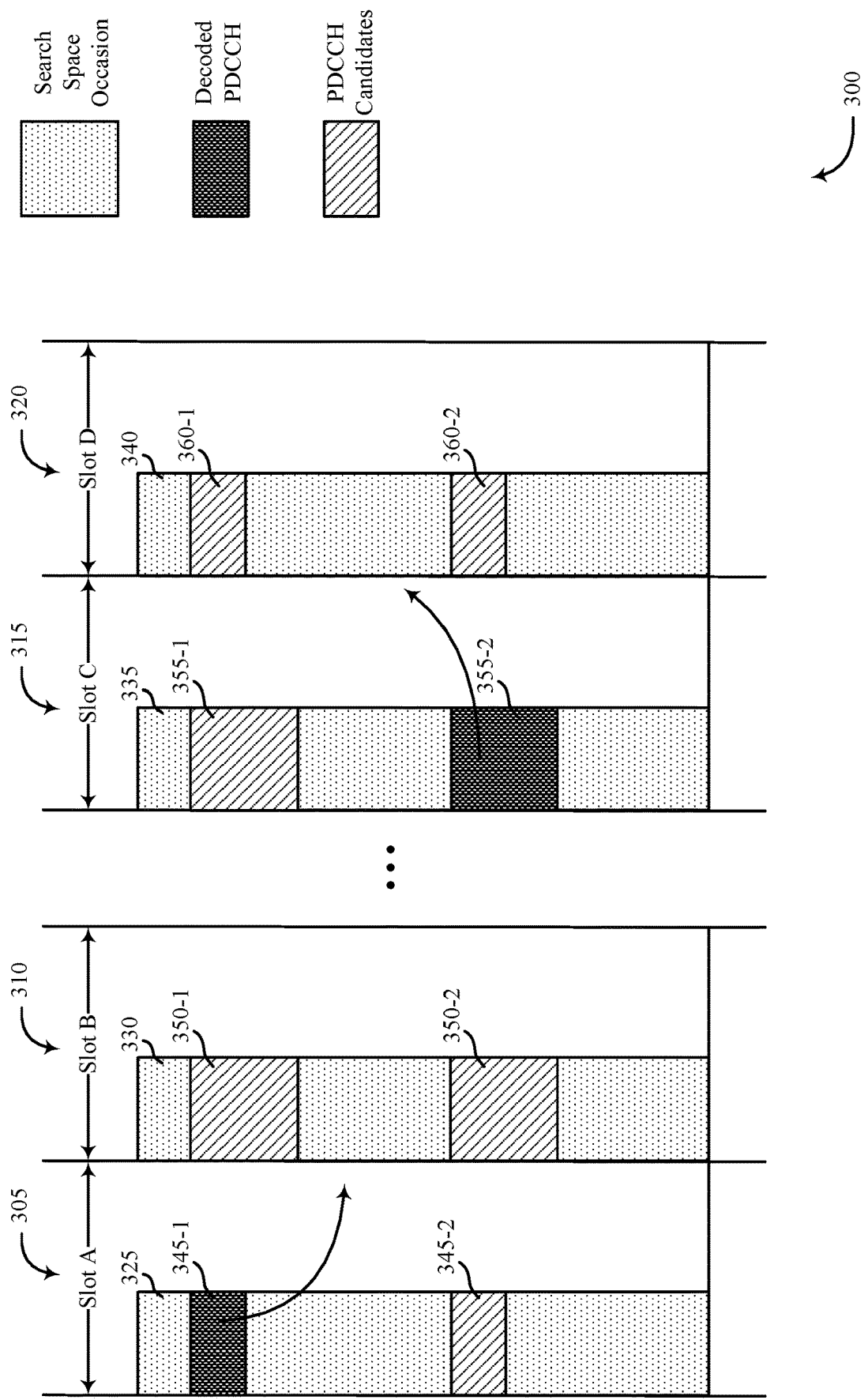

FIG. 3 illustrates an example of a communications environment 300 that supports dynamic configuration and adaptation of physical downlink control channel candidates in accordance with aspects of the present disclosure. In some examples, environment 300 may implement aspects of wireless communication system 100.

As illustrated, environment 300 includes at least slot A 305, slot B 310, slot C 315, and slot D 320. As shown, slot A 305 includes search space occasion 325, slot B 310 includes search space occasion 330, slot C 315 includes search space occasion 335, and slot D 320 includes search space occasion 340. In one example, search space occasion 325 may include multiple PDCCH candidates (e.g., PDCCH candidates 345-1 and 345-2). As shown, PDCCH candidate 345-1 may be a decoded PDCCH candidate.

In some examples, decoded PDCCH candidate 345-1 may indicate one or more aggregation level to monitor in a current slot or a subsequent slot, or both, (e.g., in all concurrent or subsequent search space occasions until a next PDCCH is decoded that indicates a change to the aggregation levels to monitor). In one example, an aggregation level may refer to the number of control channel elements (CCEs) that are allocated to a particular PDCCH candidate. In some cases, a PDCCH candidate may be associated with aggregation level 1, aggregation level 2, aggregation level 4, or aggregation level 8. In one example, aggregation level 1 means 1 CCE is allocated to a PDCCH candidate, aggregation level 2 means 2 CCEs are allocated to a PDCCH candidate, aggregation level 4 means 4 CCEs are allocated to a PDCCH candidate, and aggregation level 8 means 8 CCEs are allocated to a PDCCH candidate.

In one example, decoded PDCCH candidate 345-1 may indicate what aggregation level or levels to monitor in slot A 305 or slot B 310, or both, and in all subsequent search space occasions configured in the search space until a next PDCCH is decoded that indicates to the UE a change in the aggregation levels to be monitored (e.g., explicitly indicating one or more aggregation levels to monitor, indicating a delta set of aggregation levels that indicates one or more aggregation levels to no longer monitor or one or more aggregation levels to begin monitoring, or an amount by which to increase or decrease which aggregation levels to monitor based on an absolute number (e.g., a step-wise increase or decrease by one, by two, etc.)). For example, a UE may be originally configured to monitor aggregation level (AL) 1 and AL 2. The UE may then receive a downlink control information (DCI) message that indicates an increase of monitored ALs by one step. In this case, the UE still monitors PDCCH candidates associated with two ALs, but the ALs are a step higher than the originally configured ALs. Thus, the new ALs are AL 2 and 4, where AL 2 is the one step up from AL 1, and AL 4 is one step up from AL 2.

In some examples, a base station may configure PDCCH candidate 345-1 to indicate which aggregation levels to monitor. In one example, a message in decoded PDCCH candidate 345-1 may indicate which aggregation levels to monitor. For instance, a base station may configure the message to indicate the aggregation level(s) to monitor. In some examples, decoded PDCCH candidate 345-1 may include a DCI message that indicates the aggregation level(s) to monitor. In some cases, a DCI message of environment 300 may include a format that includes a field for indicating one or more aggregation levels to be monitored for at least one search space. How the message indicates the aggregation level(s) to monitor (e.g., whether the message indicates the specific aggregation level(s) to monitor, a delta set, or an amount of increase or decrease based on an absolute number) may be configurable by RRC, MAC, or PDCCH signaling.

Further, the granularity with which the aggregation level(s) to monitor is configured may be indicated via at least one of a RRC message, a MAC-CE message, or a DCI message, or any combination thereof. In one example, granularity may refer to a granularity at which the indication of adjusted aggregation level(s) is applied with respect to a search space. For example, the granularity message may indicate whether to apply the indication of adjusted aggregation level(s) to at least one specified search space, to all search spaces in at least one specified search space set, or to all search spaces in all search space sets. In one example, the granularity message may indicate adjusted aggregation level(s) to monitor in one or more slots relative to at least one specified search space, to all search spaces in at least one specified search space set, or to all search spaces in all search space sets.

As one example, decoded PDCCH candidate 345-1 in slot A 305 may indicate a UE is to monitor aggregation levels in search space occasion 330 of slot B 310. In some cases, decoded PDCCH candidate 345-1 may indicate a PDCCH candidate in search space occasion 330 in slot B 310 has a higher aggregation level than a PDCCH candidate of search space occasion 325 in slot A 305. Hence, as shown, PDCCH candidates 350-1 and 350-2 of slot B 310 are illustrated to be thicker than PDCCH candidates 345-1 and 345-2 of slot A 305, where the thicker PDCCH candidate indicates a higher aggregation level. Accordingly, the UE may monitor search space occasion 330 and determine that PDCCH candidate 350-1 has a higher aggregation level than PDCCH candidate 345-1 (e.g., PDCCH candidate 345-1 is allocated aggregation level 2 and PDCCH candidate 350-1 is allocated aggregation level 4 as one example, etc.).

In some examples, the UE may detect PDCCH candidate 355-1 and PDCCH candidate 355-2 in search space occasion 335 of slot C 315. In one example, a UE may monitor for aggregation level 8 in PDCCH candidate 355-1 or PDCCH candidate 355-2, or both. As shown, UE may decode PDCCH candidate 355-2. In one example, decoded PDCCH candidate 355-2 may indicate which aggregation levels to monitor in a PDCCH candidate of slot C 335 or slot D 340, or both. As one example, decoded PDCCH candidate 355-2 may indicate the UE is to monitor for aggregation level 4 in a PDCCH candidate of search space occasion 340. Accordingly, the UE may monitor search space occasion 340 and detect PDCCH candidate 360-1 and PDCCH candidate 360-2 and monitor for aggregation level 4 in PDCCH candidate 360-1 and monitor for aggregation level 4 in PDCCH candidate 360-2. Accordingly, the UE may monitor search space occasion 340 and determine that PDCCH candidate 360-1 is allocated a lower aggregation level than PDCCH candidate 355-1 (e.g., aggregation level 8 is allocated to PDCCH candidate 355-1 and aggregation level 4 is allocated to PDCCH candidate 360-1 as one example).

Figure 4:
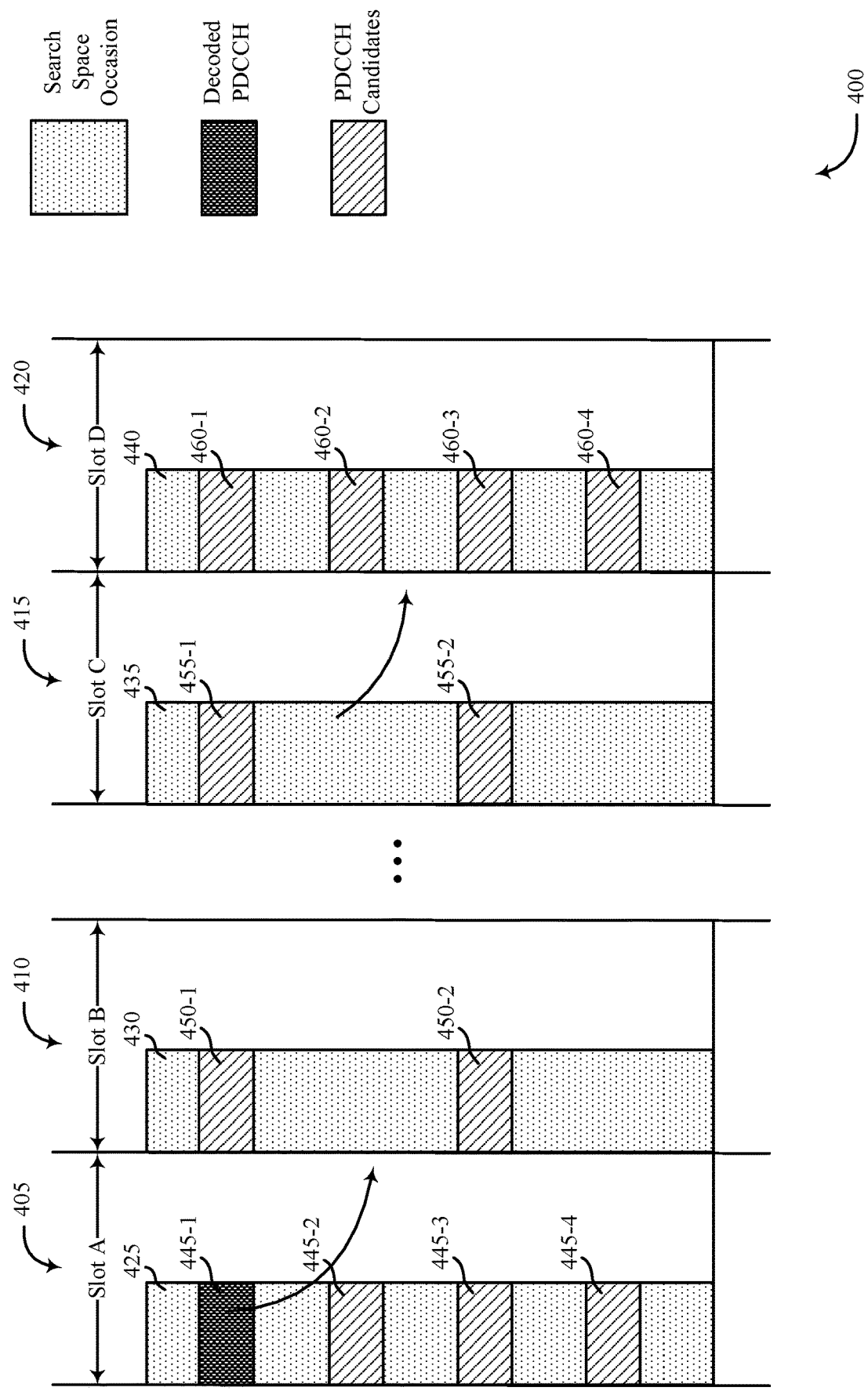

FIG. 4 illustrates an example of a communications environment 400 that supports dynamic configuration and adaptation of physical downlink control channel candidates in accordance with aspects of the present disclosure. In some examples, environment 400 may implement aspects of wireless communication system 100.

As illustrated, environment 400 includes at least slot A 405, slot B 410, slot C 415, and slot D 420. As shown, slot A 405 includes search space occasion 425, slot B 410 includes search space occasion 430, slot C 415 includes search space occasion 435, and slot D 420 includes search space occasion 440. In one example, search space occasion 425 may include multiple PDCCH candidates (e.g., PDCCH candidates 445-1 and 445-2). As shown, PDCCH candidate 445-1 may be a decoded PDCCH candidate.

In some examples, decoded PDCCH candidate 445-1 may indicate a number of PDCCH candidates to monitor in slot B 410. In one example, decoded PDCCH candidate 445-1 may indicate a UE is to monitor two PDCCH candidates in search space occasion 430 of slot B 410. Accordingly, the UE may monitor search space occasion 430 and detect PDCCH candidate 450-1 and PDCCH candidate 450-2 based on the monitoring.

In one example, a UE may fail to detect or decode a PDCCH candidate. For example, a UE may fail to detect or decode PDCCH candidate 455-1 or PDCCH candidate 455-2 in slot C 415, or fail to detect or decode both. In some examples, upon failing to detect or decode each PDCCH candidate in slot C 415 (e.g., PDCCH candidate 455-1 and PDCCH candidate 455-2), the UE may autonomously adjust the number of PDCCH candidates to monitor in a current slot or subsequent slot, or in both, (e.g., slot C 415 or slot D 420, or both, and in all subsequent search space occasions configured in the search space until a next PDCCH is decoded that indicates to the UE a change in the number of PDCCH candidates to be monitored). Similarly, upon succeeding in decoding at least one PDCCH candidate in slot C 415 (e.g., PDCCH candidate 455-1 and PDCCH candidate 455-2), the UE may autonomously adjust the number of PDCCH candidates to monitor in a current slot or subsequent slot, or both, (e.g., slot C 415 or slot D 420, or both, and in all subsequent search space occasions configured in the search space until a next PDCCH is decoded that indicates to the UE a change in the number of PDCCH candidates to be monitored). The UE may autonomously adjust the number of PDCCH candidates to monitor based on how many PDCCH candidates the UE decodes for any number of slots (e.g., some number of consecutive slots without decoding a PDCCH candidate, some number of consecutive slots with decoding a PDCCH candidate, or an average number of decoded PDCCH candidate over some number of consecutive slots, or any combination thereof). For example, a UE may autonomously increase or decrease the number of PDCCH candidates to monitor in a current slot or subsequent slot, or both, (e.g., and in all subsequent search space occasions configured in the search space until a next PDCCH is decoded that indicates to the UE a change in the aggregation levels to be monitored) based on a number of PDCCH candidates decoded in the current slot. In the illustrated example, a UE may autonomously determine to monitor four PDCCH candidates in slot D 420 (e.g., PDCCH candidates 460-1 to 460-4) after monitoring two PDCCH candidates in slot C 415 and failing to detect or decode one of the PDCCH candidates in slot C 415, or both.

In some cases, the UE may autonomously increase or decrease the number of PDCCH candidates to monitor based on a ratio (e.g., double, half). In some cases, the UE may autonomously increase or decrease the number of PDCCH candidates to monitor based on an absolute number. A base station may indicate whether the UE is to increase or decrease the number of PDCCH candidates to monitor based on a ratio or based on an absolute number via RRC or MAC signaling. Whether the UE is to increase the number of PDCCH candidates to monitor based on decoding a PDCCH candidate (and/or decrease the number of PDCCH candidates to monitor based on not decoding a PDCCH candidate), or decrease the number of PDCCH candidates to monitor based on decoding a PDCCH candidate (and/or increase the number of PDCCH candidates to monitor based on not decoding a PDCCH candidate), may be configurable by a base station via RRC or MAC signaling, and may be separately configurable for uplink- and downlink-related PDCCH.

The UE may autonomously change the number of PDCCH candidates to monitor in one or more slots relative to at least one specified search space, to all search spaces in at least one specified search space set, or to all search spaces in all search space sets, which may be referred to as the granularity of the adjustment. A base station may indicate the granularity of the adjustment to the UE via RRC or MAC signaling.

A base station may know or expect the number of PDCCH candidates that a UE should decode in a current slot and thus may, via application of similar rules or algorithms as the UE, determine the number of PDCCH candidates to be monitored by the UE in other slots, even if the UE is making such determinations autonomously.

Figure 5:
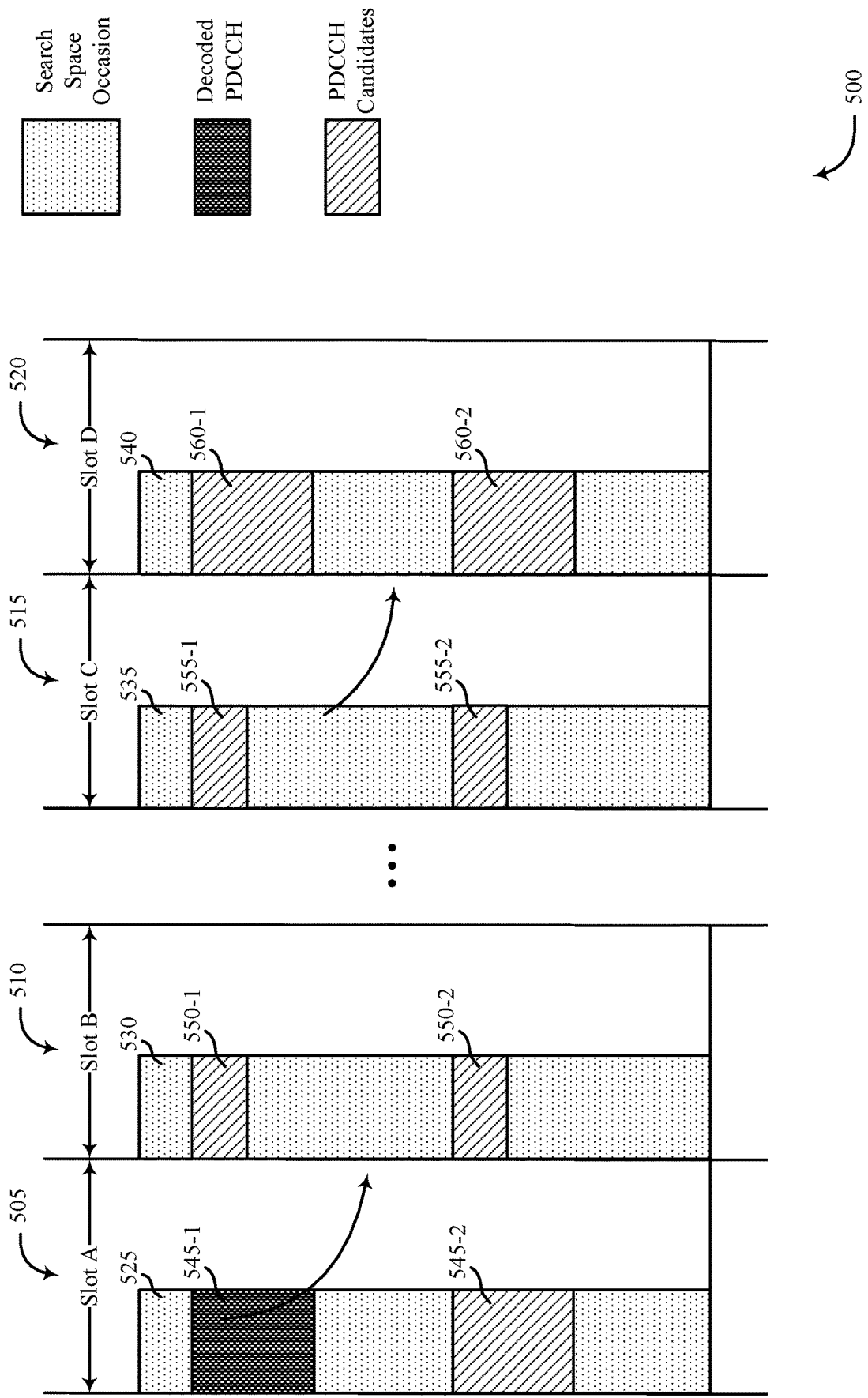

FIG. 5 illustrates an example of a communications environment 500 that supports dynamic configuration and adaptation of physical downlink control channel candidates in accordance with aspects of the present disclosure. In some examples, environment 500 may implement aspects of wireless communication system 100.

As illustrated, environment 500 includes at least slot A 505, slot B 510, slot C 515, and slot D 520. As shown, slot A 505 includes search space occasion 525, slot B 510 includes search space occasion 530, slot C 515 includes search space occasion 535, and slot D 520 includes search space occasion 540. In one example, search space occasion 525 may include multiple PDCCH candidates (e.g., PDCCH candidates 545-1 and 545-2). As shown, PDCCH candidate 545-1 may be a decoded PDCCH candidate. In one example, decoded PDCCH candidate 545-1 may indicate which aggregation levels to monitor in a PDCCH candidate of a current search space or a subsequent search space, or both, (e.g., search space occasion 525 or search space occasion 530, or both).

In one example, a UE may fail to detect or decode PDCCH candidate 555-1 or PDCCH candidate 555-2 in slot C 515 of search space occasion 535, or both. In some examples, upon failing to detect or decode each PDCCH candidate from search space occasion 535 (e.g., PDCCH candidate 555-1 and PDCCH candidate 555-2), the UE may autonomously adjust the aggregation level(s) to monitor in a current search space or subsequent search space, or both, (e.g., search space occasion 535 or search space occasion 540, or both). For example, a UE may autonomously increase or decrease the aggregation level(s) to monitor in a current search space or subsequent search space, or both. The UE may autonomously adjust the aggregation level(s) to monitor based on how many PDCCH candidates the UE decodes for any number of slots (e.g., some number of consecutive slots without decoding a PDCCH candidate, some number of consecutive slots with decoding a PDCCH candidate, or an average number of decoded PDCCH candidate, or both, over some number of consecutive slots). In the illustrated example, a UE may autonomously determine to allocate a higher aggregation level to monitor in PDCCH candidate 560-1 and PDCCH candidate 560-2 in search space occasion 540, after monitoring for a lower aggregation level in search space occasion 535.

In some cases, the UE may autonomously increase or decrease the aggregation level(s) to monitor based on an absolute number (e.g., a step size). The UE may autonomously change the aggregation level(s) to monitor in one or more slots relative to at least one specified search space, to all search spaces in at least one specified search space set, or to all search spaces in all search space sets, which may be referred to as the granularity of the adjustment. A base station may indicate the granularity of the adjustment to the UE via RRC or MAC signaling. Whether the UE is to increase the aggregation level(s) to monitor based on decoding a PDCCH candidate (and/or decrease the aggregation level(s) to monitor based on not decoding a PDCCH candidate), or decrease the aggregation level(s) to monitor based on decoding a PDCCH candidate (and/or increase the aggregation level(s) to monitor based on not decoding a PDCCH candidate), may be configurable by a base station via RRC or MAC signaling, and may be separately configurable for uplink- and downlink-related PDCCH.

A base station may know or expect the number of PDCCH candidates that a UE should decode in a current slot and thus may, via application of similar rules or algorithms as the UE, determine the aggregation level(s) to be monitored by the UE in other slots, even if the UE is making such determinations autonomously.

Figure 6:
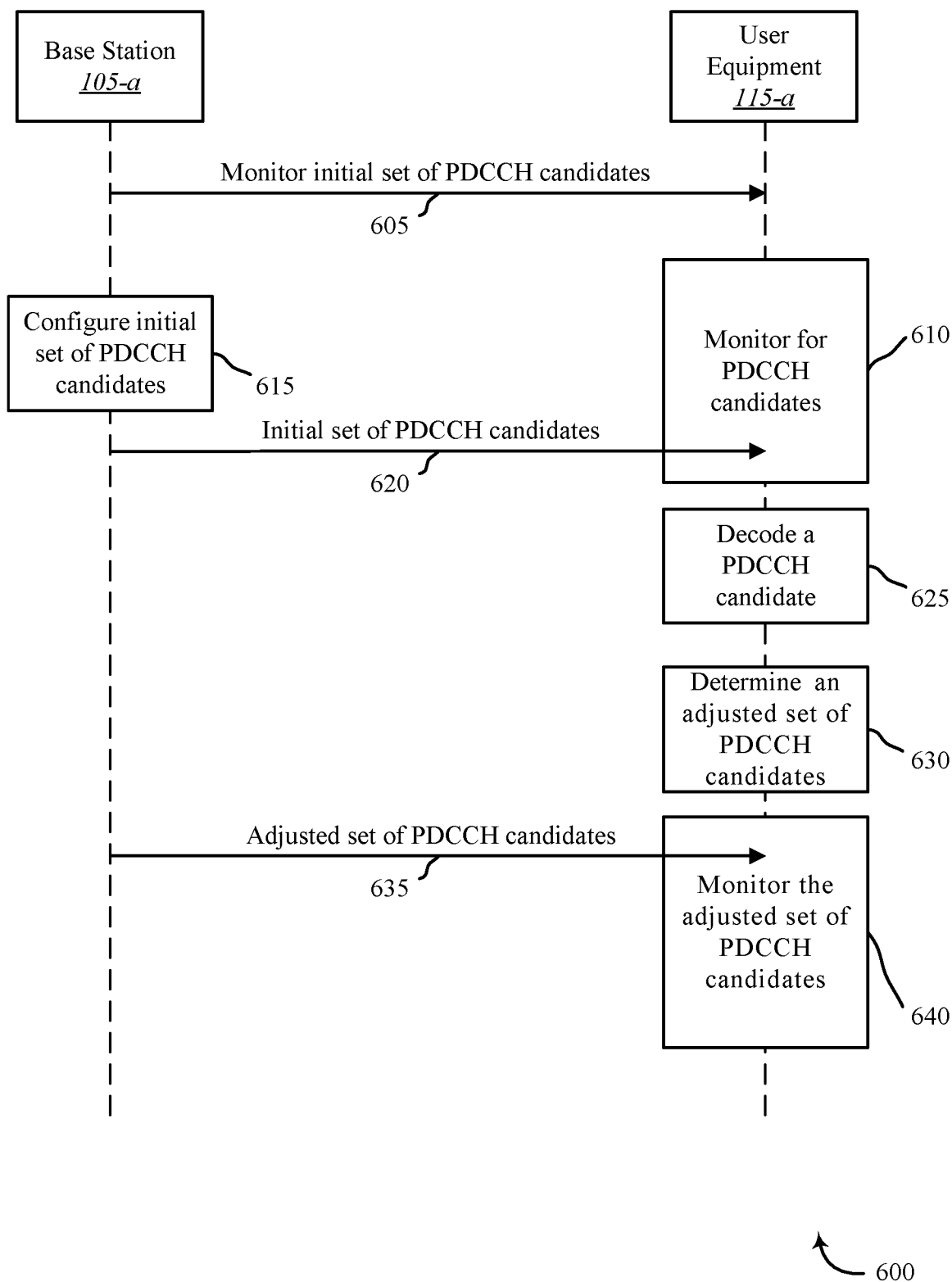
FIGS. 6 and 7 illustrates an example of a process that supports dynamic configuration and adaptation of physical downlink control channel candidates in accordance with aspects of the present disclosure.

FIG. 6 illustrates an example of a process 600 that supports dynamic configuration and adaptation of physical downlink control channel candidates in accordance with aspects of the present disclosure. In some examples, process 600 may be implemented by aspects of wireless communication system 100.

At 605, base station 105-a may send a message to UE 115-a indicating to UE 115-a to monitor for an initial set of PDCCH candidates. At block 610, UE 115-a may monitor for the initial set of PDCCH candidates.

At block 615, base station 105-a may configure an initial set of physical downlink control channel (PDCCH) candidates. At 620, base station 105-a may send the initial set of PDCCH candidates to user equipment (UE) 115-a. In some examples, UE 115-a may receive the initial set of PDCCH candidates in a first slot.

At block 625, UE 115-a may decode a PDCCH candidate from the initial set received from base station 105-a at 620. At block 630, UE 115-a may determine an adjusted set of PDCCH candidates to monitor based at least in part on information obtained from the decoding of the PDCCH candidate at block 625.

At 635, base station 105-a may send the adjusted set of PDCCH candidates to UE 115-a. In some cases, the adjusted set of PDCCH candidates may occur in the first slot with the initial set of PDCCH candidates. Alternatively, the adjusted set of PDCCH candidates may occur in a second slot after the first slot. At block 640, UE 115-a may monitor the adjusted set of PDCCH candidates.

It is to be understood that the operations illustrated in process 600 may be temporally rearranged and further that in some cases, operations shown as occurring sequentially in the example of FIG. 6 may occur simultaneously. For example, UE 115-a may monitor for the initial set of PDCCH candidates before, after, or concurrently with base station 105-a transmitting the initial set of PDCCH candidates, and, UE 115-a may monitor for the adjusted set of PDCCH candidates before, after, or concurrently with base station 105-*a* transmitting the adjusted set of PDCCH candidates.

Figure 7:
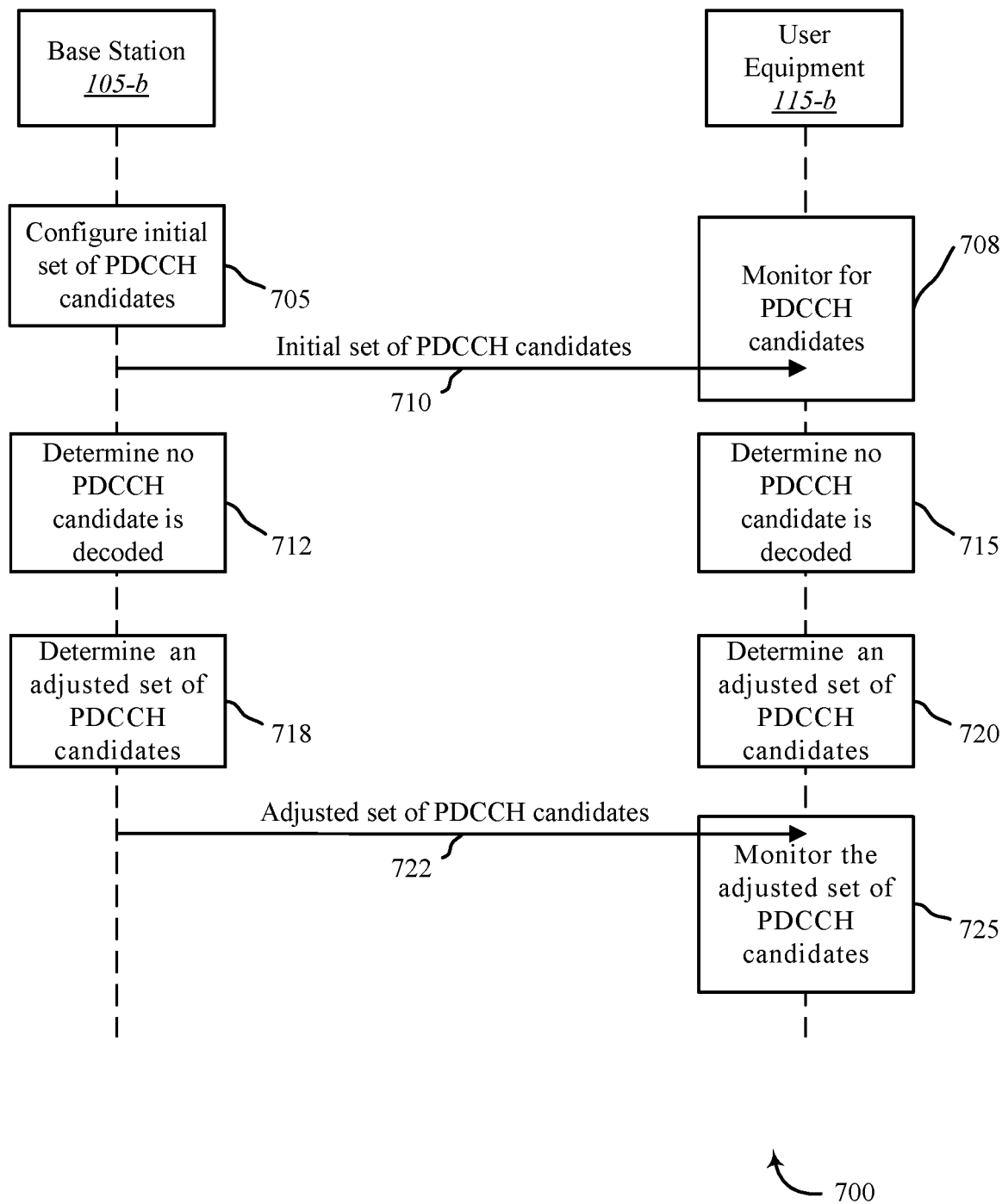

FIG. 7 illustrates an example of a process 700 that supports dynamic configuration and adaptation of physical downlink control channel candidates in accordance with aspects of the present disclosure. In some examples, process 700 may be implemented by aspects of wireless communication system 100.

At block 705, base station 105-*b* may configure an initial set of physical downlink control channel (PDCCH) candidates. At block 708, UE 115-*b* may monitor for the initial set of PDCCH candidates. At 710, base station 105-*b* may send the initial set of PDCCH candidates to user equipment (UE) 115-*b*. In one example, UE 115-*b* may receive the initial set of PDCCH candidates in a first slot.

In one example, UE 115-*b* may attempt to decode one or more PDCCH candidates from the initial set. In some cases, UE 115-*b* may determine whether one or more physical downlink control channel candidates in the initial set are successfully decoded.

At block 712, base station 105-*b* may determine that no PDCCH candidates from the initial set are decoded by UE 115-*b*. As one example, base station 105-*b* may determine that UE 115-*b* is not able to detect or decode a PDCCH candidate from the initial set.

At block 715, UE 115-*b* may determine that no PDCCH candidates from the initial set are decoded. As one example, UE 115-*b* may determine that it is not able to detect or decode a PDCCH candidate from the initial set. In some examples, both base station 105-*b* and UE 115-*b* may determine that no PDCCH candidates from the initial set are decoded. Alternatively, either base station 105-*b* or UE 115-*b* may determine that no PDCCH candidates from the initial set are decoded. For example, UE 115-*b* may determine that no PDCCH candidates from the initial set are decoded and inform base station 105-*b* that no PDCCH candidates from the initial set are decoded.

At block 718, base station 105-*b* may determine an adjusted set of PDCCH candidates for UE 115-*b* to monitor based at least in part on the determination that no PDCCH candidates from the initial set are decoded. In one example, base station 105-*b* may communicate a message to UE 115-*b*, indicating the adjusted set of PDCCH candidates in the message to UE 115-*b*.

At block 720, UE 115-*b* may determine an adjusted set of PDCCH candidates to monitor based at least in part on the determination that no PDCCH candidates from the initial set are decoded. In one example, UE 115-*b* may communicate a message to base station 105-*b*, indicating the adjusted set of PDCCH candidates in the message to base station 105-*b*. In some examples, both base station 105-*b* and UE 115-*b* may determine an adjusted set of PDCCH candidates. Alternatively, either base station 105-*b* or UE 115-*b* may determine an adjusted set of PDCCH candidates.

At 722, base station 105-*b* may send the adjusted set of PDCCH candidates to UE 115-*b*. At block 725, UE 115-*b* may monitor the adjusted set of PDCCH candidates. In some examples, the adjusted set of PDCCH candidates may occur in the first slot with the initial set of PDCCH candidates. Alternatively, the adjusted set of PDCCH candidates may occur in a second slot after the first slot.

It is understood that the operations illustrated in process 700 may be temporally rearranged and further that in some cases, operations shown as occurring sequentially in the example of FIG. 7 may occur simultaneously. For example, UE 115-*b* may monitor for the initial set of PDCCH candidates before, after, or concurrently with base station 105-*b* transmitting the initial set of PDCCH candidates, and, UE 115-*b* may monitor for the adjusted set of PDCCH candidates before, after, or concurrently with base station 105-*b* transmitting the adjusted set of PDCCH candidates. Further, though not illustrated in the example of FIG. 7, it is to be understood that base station 105-*b* may determine the adjusted set of PDCCH candidates in parallel with UE 115-*b* based on like considerations in order to remain synchronized (aligned, consistent) with UE 115-*b* regarding the adjusted set of PDCCH candidates.

Figure 8:
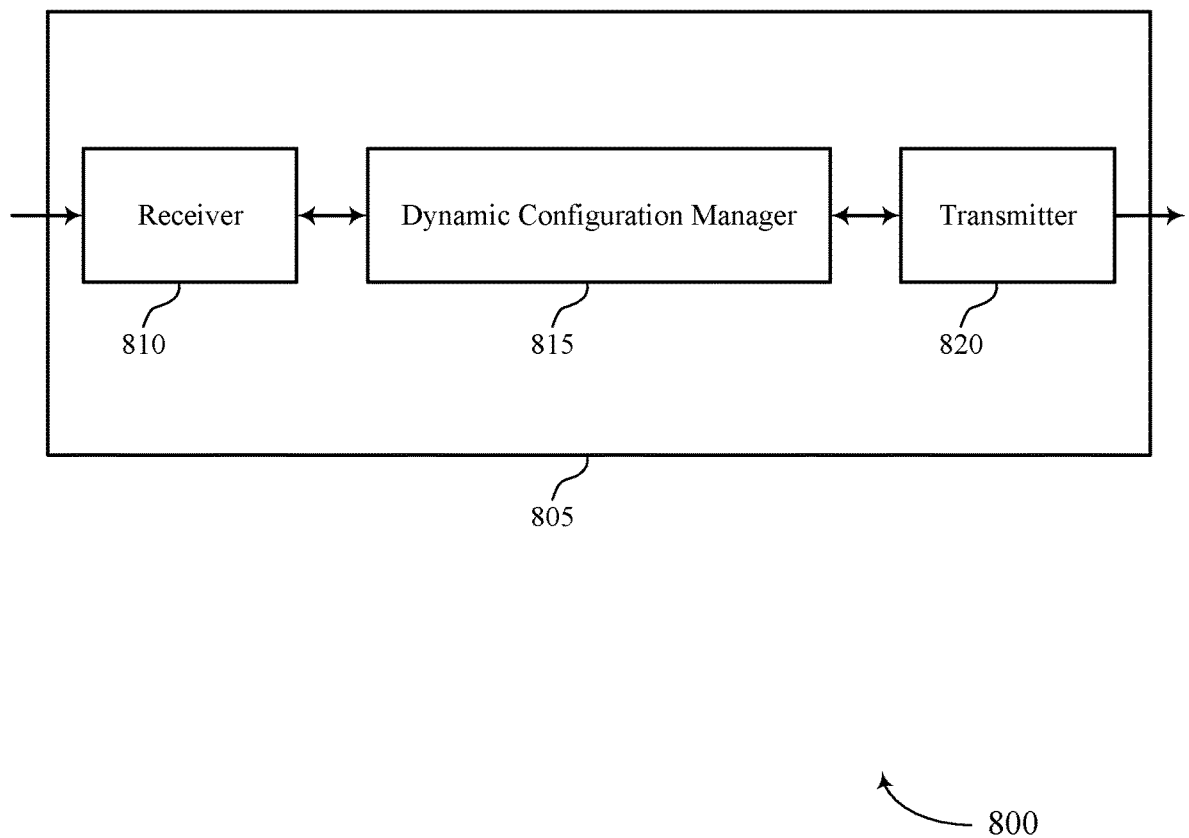
FIGS. 8 and 9 show block diagrams of devices that support dynamic configuration and adaptation of physical downlink control channel candidates in accordance with aspects of the present disclosure.

FIG. 8 shows a block diagram 800 of a device 805 that supports dynamic configuration and adaptation of physical downlink control channel candidates in accordance with aspects of the present disclosure. The device 805 may be an example of aspects of a UE 115 as described herein. The device 805 may include a receiver 810, a dynamic configuration manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to dynamic configuration and adaptation of physical downlink control channel candidates, etc.). Information may be passed on to other components of the device 805. The receiver 810 may be an example of aspects of the transceiver 1120 described with reference to FIG. 11. The receiver 810 may utilize a single antenna or a set of antennas.

In some cases, the dynamic configuration manager 815 may monitor, by a UE, an initial set of physical downlink control channel candidates in a first slot, monitor, by the UE in the second slot, the adjusted set of physical downlink control channel candidates, and receive, by the UE, an indication of an adjusted set of physical downlink control channel candidates to monitor in a second slot based on decoding a physical downlink control channel candidate in the initial set.

In some cases, the dynamic configuration manager 815 may also receive, by a UE, an initial set of physical downlink control channel candidates, determine, by the UE, whether one or more physical downlink control channel candidates in the initial set are successfully decoded, determine, by the UE, an adjusted set of physical downlink control channel candidates to monitor based on whether one or more physical downlink control channel candidates in the initial set are successfully decoded, and monitor, by the UE, the adjusted set of physical downlink control channel candidates. The dynamic configuration manager 815 may be an example of aspects of the dynamic configuration manager 1110 described herein. In some cases, a base station (e.g., a dynamic configuration manager at a base station) may invoke (apply) the same one or more rules to determine the adjusted set of physical downlink control candidates monitored by the UE, and therefore the UE and the base station may remain in sync regarding the adjusted set of physical downlink control candidates.

The dynamic configuration manager 815, or its sub-components, may be implemented in hardware, code (e.g., software or firmware) executed by a processor, or any combination thereof. If implemented in code executed by a processor, the functions of the dynamic configuration manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The dynamic configuration manager 815, or its subcomponents, may be physically located at various positions, including being distributed such that portions of functions are implemented at different physical locations by one or more physical components. In some examples, the dynamic configuration manager 815, or its sub-components, may be a separate and distinct component in accordance with various aspects of the present disclosure. In some examples, the dynamic configuration manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
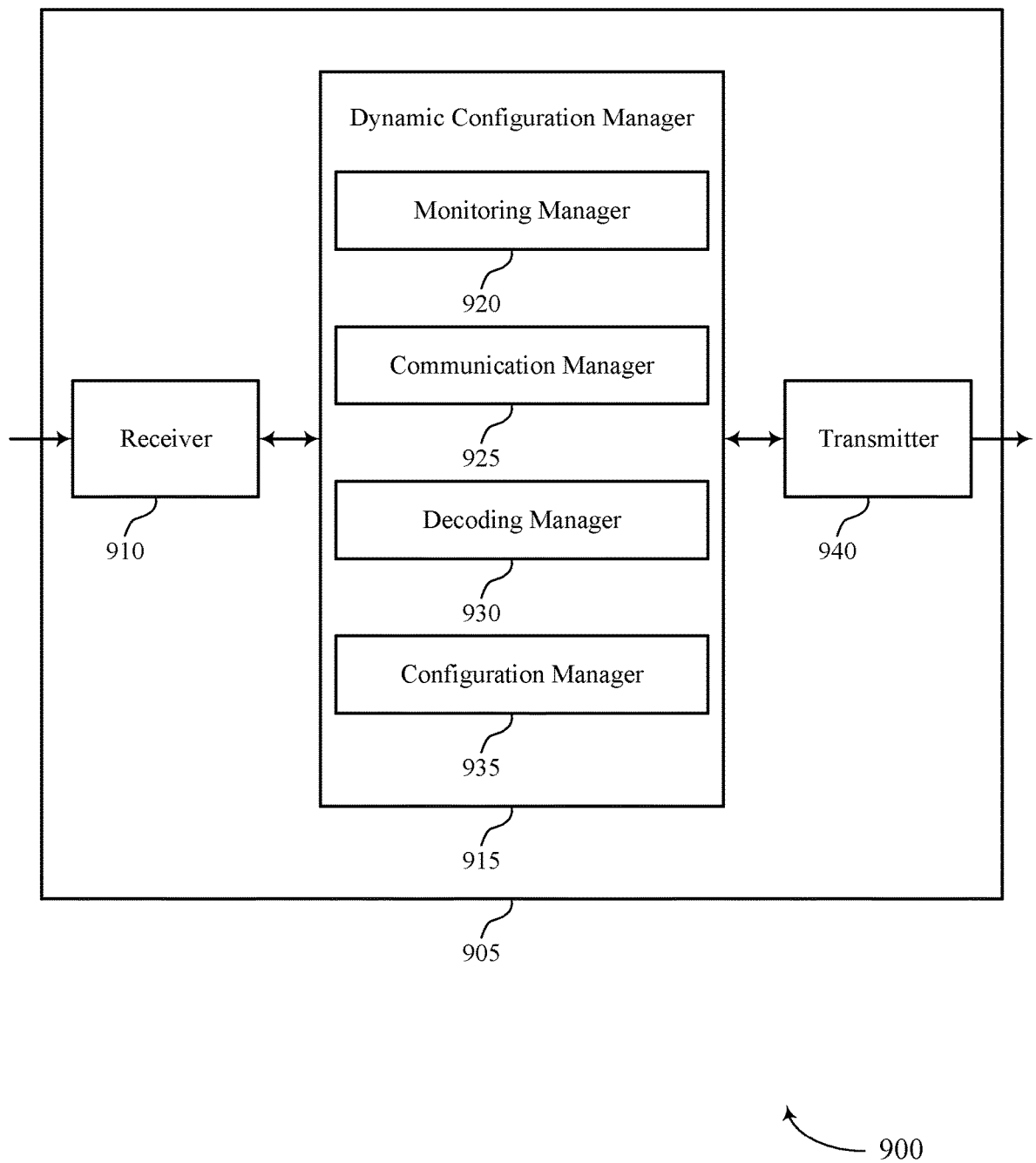

FIG. 9 shows a block diagram 900 of a device 905 that supports dynamic configuration and adaptation of physical downlink control channel candidates in accordance with aspects of the present disclosure. The device 905 may be an example of aspects of a device 805 or a UE 115 as described herein. The device 905 may include a receiver 910, a dynamic configuration manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to dynamic configuration and adaptation of physical downlink control channel candidates, etc.). Information may be passed on to other components of the device 905. The receiver 910 may be an example of aspects of the transceiver 1120 described with reference to FIG. 11. The receiver 910 may utilize a single antenna or a set of antennas.

The dynamic configuration manager 915 may be an example of aspects of the dynamic configuration manager 815 as described herein. The dynamic configuration manager 915 may include a monitoring manager 920, a communication manager 925, a decoding manager 930, and a configuration manager 935. The dynamic configuration manager 915 may be an example of aspects of the dynamic configuration manager 1110 described herein.

In some cases, the monitoring manager 920 may monitor, by a UE, an initial set of physical downlink control channel candidates in a first slot and monitor, by the UE in the second slot, the adjusted set of physical downlink control channel candidates. The communication manager 925 may receive, by the UE, an indication of an adjusted set of physical downlink control channel candidates to monitor in a second slot based on decoding a physical downlink control channel candidate in the initial set.

In some cases, the communication manager 925 may receive, by a UE, an initial set of physical downlink control channel candidates. The decoding manager 930 may determine, by the UE, whether one or more physical downlink control channel candidates in the initial set are successfully decoded. The configuration manager 935 may determine, by the UE, an adjusted set of physical downlink control channel candidates to monitor based on whether one or more physical downlink control channel candidates in the initial set are successfully decoded. In some cases, a base station may invoke (apply) the same one or more rules to determine the adjusted set of physical downlink control candidates monitored by the UE, and therefore the UE and the base station may remain in sync regarding the adjusted set of physical downlink control candidates.

The monitoring manager 920 may monitor, by the UE, the adjusted set of physical downlink control channel candidates. The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
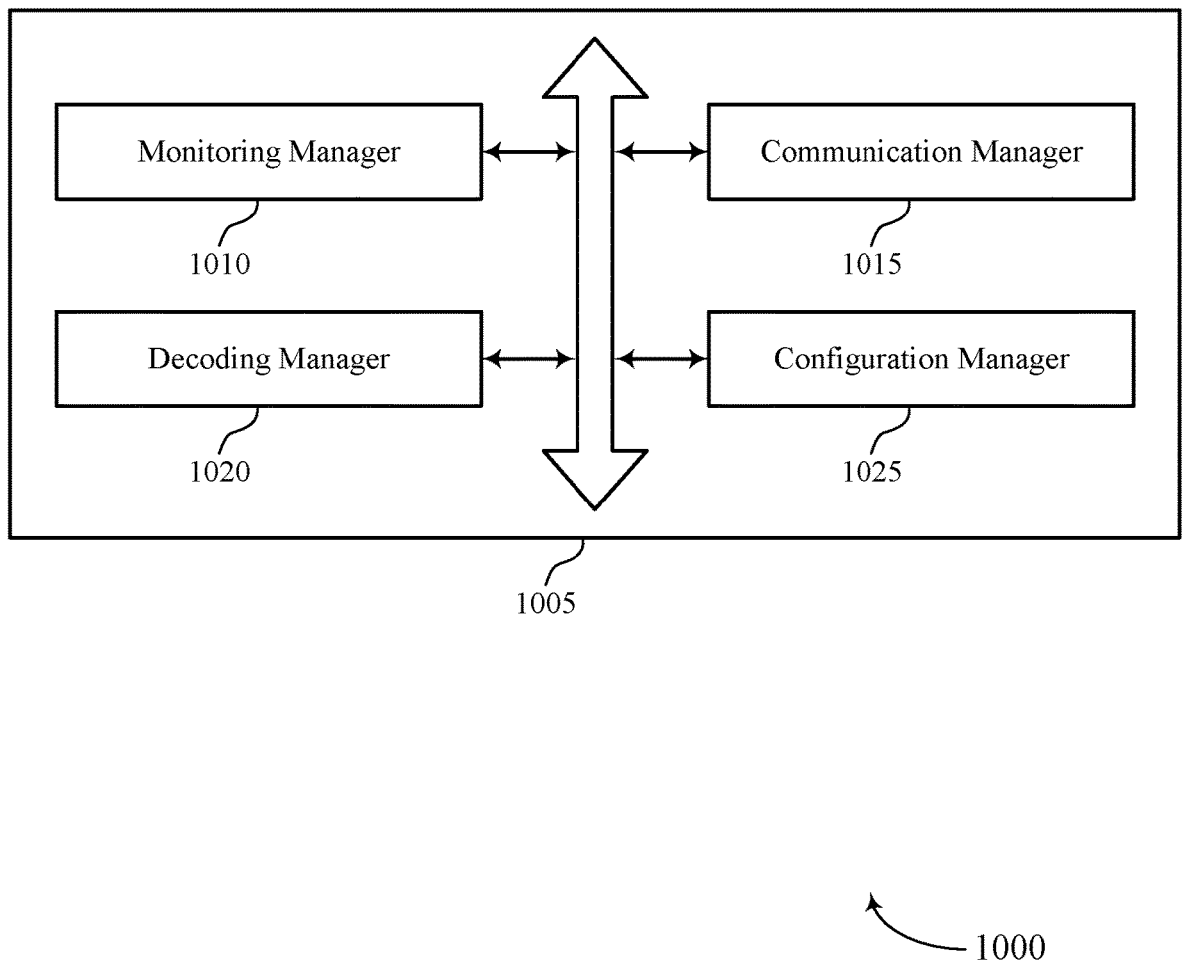
FIG. 10 shows a block diagram of a dynamic configuration manager that supports dynamic configuration and adaptation of physical downlink control channel candidates in accordance with aspects of the present disclosure.

FIG. 10 shows a block diagram 1000 of a dynamic configuration manager 1005 that supports dynamic configuration and adaptation of physical downlink control channel candidates in accordance with aspects of the present disclosure. The dynamic configuration manager 1005 may be an example of aspects of a dynamic configuration manager 815, a dynamic configuration manager 915, or a dynamic configuration manager 1110 described herein. The dynamic configuration manager 1005 may include a monitoring manager 1010, a communication manager 1015, a decoding manager 1020, and a configuration manager 1025. Each of these modules may communicate, directly or indirectly, with one another (e.g., via one or more buses).

The monitoring manager 1010 may monitor, by a UE, an initial set of physical downlink control channel candidates in a first slot. In some examples, the monitoring manager 1010 may monitor, by the UE in the second slot, the adjusted set of physical downlink control channel candidates.

In some examples, the monitoring manager 1010 may monitor, by the UE, the adjusted set of physical downlink control channel candidates. In some examples, the monitoring manager 1010 may monitor the adjusted set of physical downlink control channel candidates in at least one specified search space, in all search spaces in at least one specified search space set, or in all search spaces in all search space sets.

The communication manager 1015 may receive, by the UE, an indication of an adjusted set of physical downlink control channel candidates to monitor in a second slot based on decoding a physical downlink control channel candidate in the initial set. In some examples, the communication manager 1015 may receive, by a UE, an initial set of physical downlink control channel candidates.

In some examples, the communication manager 1015 may receive a granularity message indicating how to apply the indication of the adjusted set of physical downlink control channel candidates to associated search spaces, the granularity message including at least one of a RRC message, a media access control element (MAC-CE) message, or a DCI message, or any combination thereof. In one example, granularity may refer to a granularity at which the indication of the adjusted set of physical downlink control channel candidates is applied with respect to a search space. For example, the granularity message may indicate whether to apply the indication of the adjusted set of physical downlink control channel candidates to at least one specified search space, to all search spaces in at least one specified search space set, or to all search spaces in all search space sets. In one example, the granularity message may indicate a number of PDCCH candidates to monitor in one or more slots relative to at least one specified search space, to all search spaces in at least one specified search space set, or to all search spaces in all search space sets. Additionally or alternatively, the granularity message may indicate which aggregation levels to monitor in one or more slots relative to at least one specified search space, to all search spaces in at least one specified search space set, or to all search spaces in all search space sets.

In some examples, the communication manager 1015 may receive a candidate adjustment message including at least one of a RRC message, a media access control element (MAC-CE) message, or a DCI message, or any combination thereof.

In some examples, the communication manager 1015 may receive an aggregation level adjustment message including at least one of a RRC message, a media access control element (MAC-CE) message, or a DCI message, or any combination thereof. The decoding manager 1020 may determine, by the UE, whether one or more physical downlink control channel candidates in the initial set are successfully decoded.

In some examples, configuration manager 1025 may obtain, by the UE from the decoded physical downlink control channel candidate, a DCI message that includes the indication of the adjusted set of physical downlink control channel candidates. The configuration manager 1025 may determine, by the UE, an adjusted set of physical downlink control channel candidates to monitor based on whether one or more physical downlink control channel candidates in the initial set are successfully decoded. In some cases, a base station may invoke (apply) the same one or more rules to determine the adjusted set of physical downlink control candidates monitored by the UE, and therefore the UE and the base station may remain in sync regarding the adjusted set of physical downlink control candidates.

In some examples, the configuration manager 1025 may determine, by the UE, the adjusted set of physical downlink control channel candidates based on the indication. In some examples, the configuration manager 1025 may apply the indication of the adjusted set of physical downlink control channel candidates to at least one specified search space, to all search spaces in at least one specified search space set, or to all search spaces in all search space sets.

In some examples, the configuration manager 1025 may identify, based on the indication of the adjusted set of physical downlink control channel candidates, a specific number of physical downlink control channel candidates in the adjusted set of physical downlink control channel candidates, a specific value by which a number of physical downlink control channel candidates is increased or decreased in the adjusted set of physical downlink control channel candidates, or a ratio by which the number of physical downlink control channel candidates is increased or decreased in the adjusted set of physical downlink control channel candidates.

In some examples, the configuration manager 1025 may determine, based on the candidate adjustment message, whether to identify the specific number, the specific value, or the ratio by which the number of physical downlink control channel candidates is increased or decreased. In some examples, the configuration manager 1025 may identify based on the indication of the adjusted set of physical downlink control channel candidates, one or more specific aggregation level to be monitored in the adjusted set of physical downlink control channel candidates, a delta set of aggregation levels indicating one or more aggregation levels to no longer monitor or one or more aggregation levels to begin monitoring, or a step value by which to increment or decrement one or more aggregation levels to be monitored in the adjusted set of physical downlink control channel candidates.

In some examples, the configuration manager 1025 may determine, based on the aggregation level adjustment message, whether to identify the one or more specific aggregation levels, the delta set of aggregation levels, or the step value. In some examples, the configuration manager 1025 may determine an adjusted number of physical downlink control channel candidates or determining an adjusted aggregation level of physical downlink control channel candidates, or any combination thereof.

In some examples, the configuration manager 1025 may increase a number of physical downlink control channel candidates or decreasing the number of physical downlink control channel candidates, or any combination thereof. In some examples, the configuration manager 1025 may increase aggregation levels in one or more search space occasions or decreasing the aggregation levels in one or more search space occasions, or any combination thereof.

In some examples, the configuration manager 1025 may increase a number of physical downlink control channel candidates in the adjusted set based on determining that no physical downlink control channel candidates in the initial set are successfully decoded. In some examples, the configuration manager 1025 may decrease the number of physical downlink control channel candidates in the adjusted set based on determining that one or more physical downlink control channel candidates in the initial set are successfully decoded. In some cases, a base station may invoke (apply) the same one or more rules to determine the adjusted set of physical downlink control candidates monitored by the UE, and therefore the UE and the base station may remain in sync regarding the adjusted set of physical downlink control candidates.

In some examples, the configuration manager 1025 may increase a number of physical downlink control channel candidates in the adjusted set based on determining that one or more physical downlink control channel candidates in the initial set are successfully decoded. In some examples, the configuration manager 1025 may decrease the number of physical downlink control channel candidates in the adjusted set based on determining that no physical downlink control channel candidates in the initial set are successfully decoded.

In some examples, the configuration manager 1025 may increase aggregation levels in the adjusted set based on determining that no physical downlink control channel candidates in the initial set are successfully decoded. In some examples, the configuration manager 1025 may decrease aggregation levels in the adjusted set based on determining that one or more physical downlink control channel candidates in the initial set are successfully decoded.

In some examples, the configuration manager 1025 may increase aggregation levels in the adjusted set based on determining that one or more physical downlink control channel candidates in the initial set are successfully decoded. In some examples, the configuration manager 1025 may decrease aggregation levels in the adjusted set based on determining that no physical downlink control channel candidates in the initial set are successfully decoded.

Figure 11:
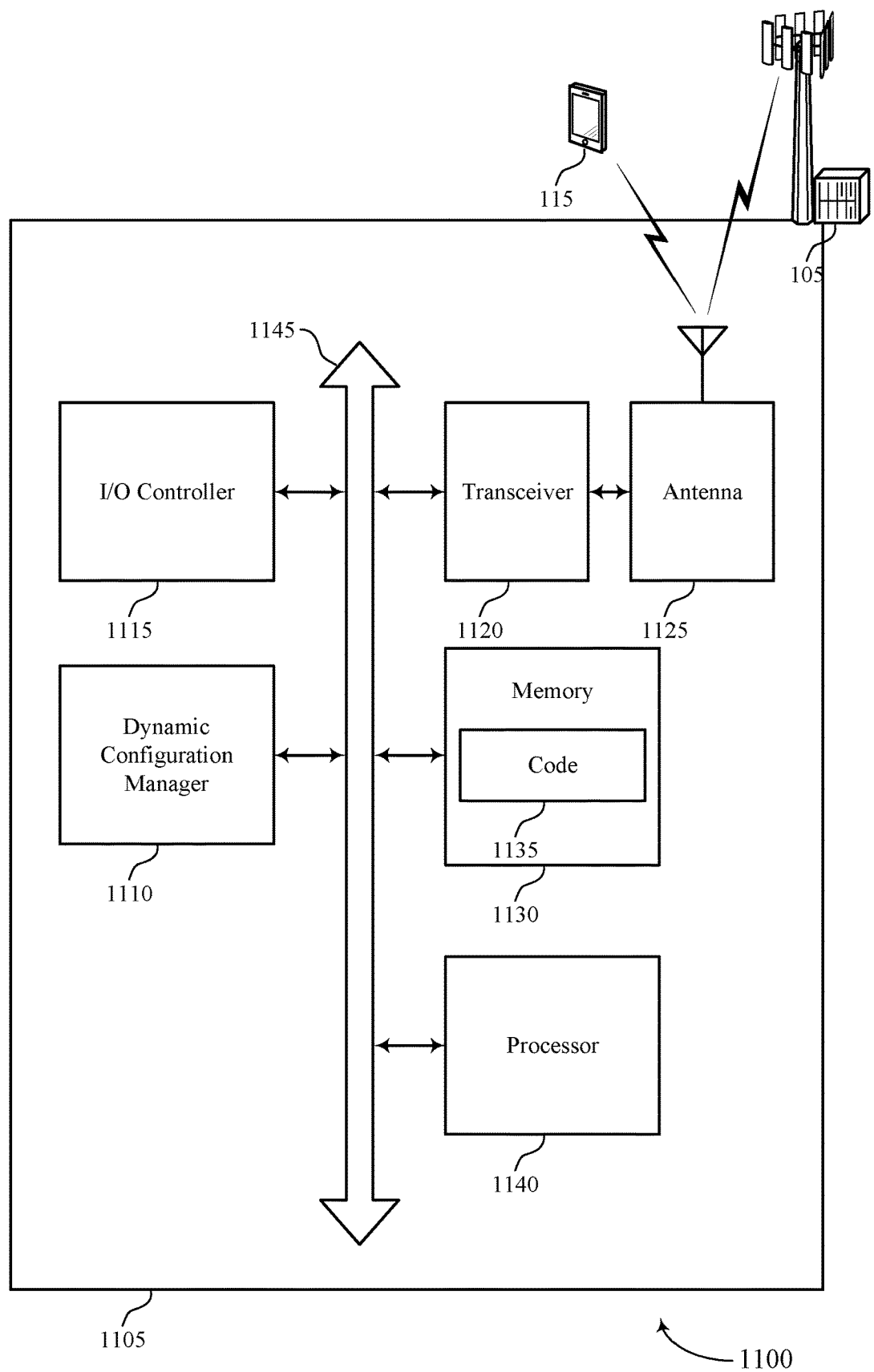
FIG. 11 shows a diagram of a system including a device that supports dynamic configuration and adaptation of physical downlink control channel candidates in accordance with aspects of the present disclosure.

FIG. 11 shows a diagram of a system 1100 including a device 1105 that supports dynamic configuration and adaptation of physical downlink control channel candidates in accordance with aspects of the present disclosure. The device 1105 may be an example of or include the components of device 805, device 905, or a UE 115 as described herein. The device 1105 may include components for bi-directional voice and data communications including components for transmitting and receiving communications, including a dynamic configuration manager 1110, an I/O controller 1115, a transceiver 1120, an antenna 1125, memory 1130, and a processor 1140. These components may be in electronic communication via one or more buses (e.g., bus 1145).

The dynamic configuration manager 1110 may monitor, by a UE, an initial set of physical downlink control channel candidates in a first slot, monitor, by the UE in the second slot, the adjusted set of physical downlink control channel candidates, and receive, by the UE, an indication of an adjusted set of physical downlink control channel candidates to monitor in a second slot based on decoding a physical downlink control channel candidate in the initial set. The dynamic configuration manager 1110 may also receive, by a UE, an initial set of physical downlink control channel candidates, determine, by the UE, whether one or more physical downlink control channel candidates in the initial set are successfully decoded, determine, by the UE, an adjusted set of physical downlink control channel candidates to monitor based on whether one or more physical downlink control channel candidates in the initial set are successfully decoded, and monitor, by the UE, the adjusted set of physical downlink control channel candidates. In some cases, a base station may invoke (apply) the same one or more rules to determine the adjusted set of physical downlink control candidates monitored by the UE, and therefore the UE and the base station may remain in sync regarding the adjusted set of physical downlink control candidates.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touch-screen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting dynamic configuration and adaptation of physical downlink control channel candidates).

The code 1135 may include instructions to implement aspects of the present disclosure, including instructions to support configuring physical downlink control channel candidates. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
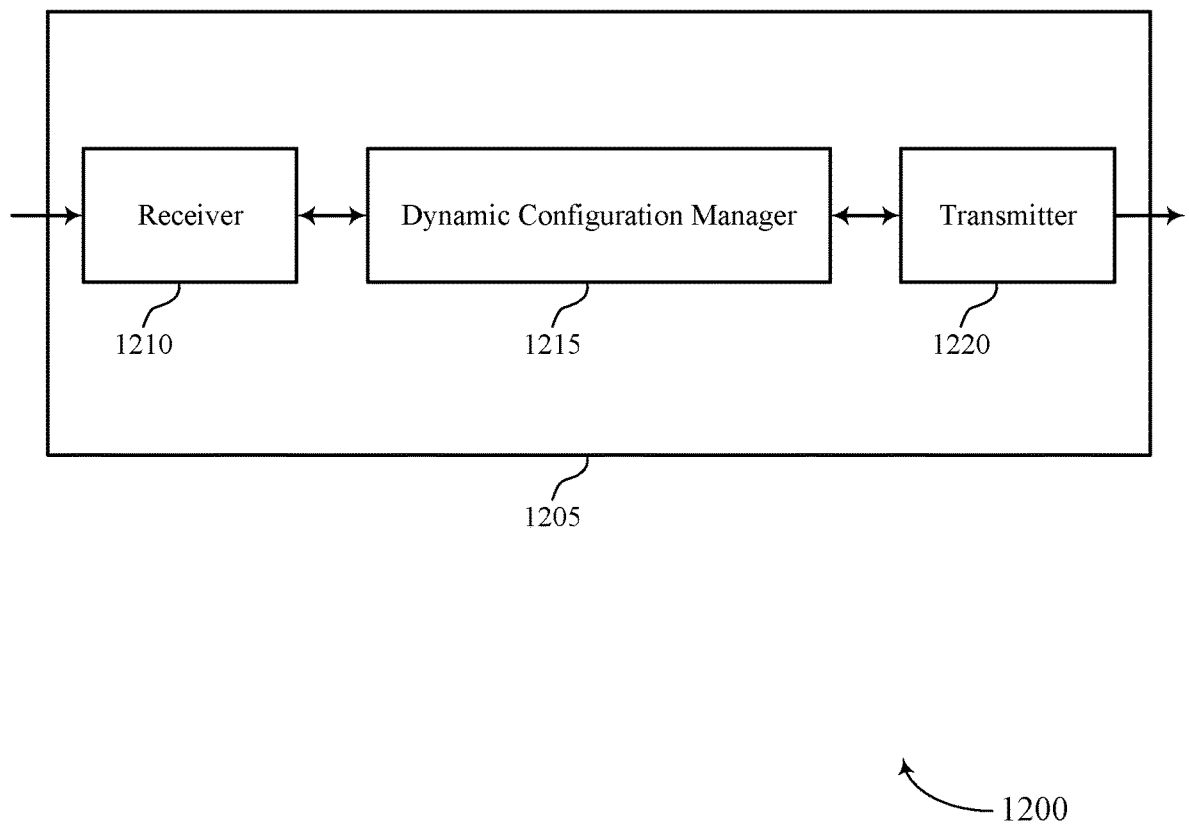
FIGS. 12 and 13 show block diagrams of devices that support dynamic configuration and adaptation of physical downlink control channel candidates in accordance with aspects of the present disclosure.

FIG. 12 shows a block diagram 1200 of a device 1205 that supports dynamic configuration and adaptation of physical downlink control channel candidates in accordance with aspects of the present disclosure. The device 1205 may be an example of aspects of a base station 105 as described herein. The device 1205 may include a receiver 1210, a dynamic configuration manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to dynamic configuration and adaptation of physical downlink control channel candidates, etc.). Information may be passed on to other components of the device 1205. The receiver 1210 may be an example of aspects of the transceiver 1520 described with reference to FIG. 15. The receiver 1210 may utilize a single antenna or a set of antennas.

The dynamic configuration manager 1215 may transmit, by a base station to a UE, an indication for the UE to monitor an initial set of physical downlink control channel candidates in a first slot, determine, by the base station, an adjusted set of physical downlink control channel candidates for the UE to monitor in a second slot, and transmit, by the base station, a physical downlink control channel candidate in the initial set that includes an indication of the adjusted set of physical downlink control channel candidates. The dynamic configuration manager 1215 may be an example of aspects of the dynamic configuration manager 1510 described herein.

The dynamic configuration manager 1215, or its sub-components, may be implemented in hardware, code (e.g., software or firmware) executed by a processor, or any combination thereof. If implemented in code executed by a processor, the functions of the dynamic configuration manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The dynamic configuration manager 1215, or its sub-components, may be physically located at various positions, including being distributed such that portions of functions are implemented at different physical locations by one or more physical components. In some examples, the dynamic configuration manager 1215, or its sub-components, may be a separate and distinct component in accordance with various aspects of the present disclosure. In some examples, the dynamic configuration manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
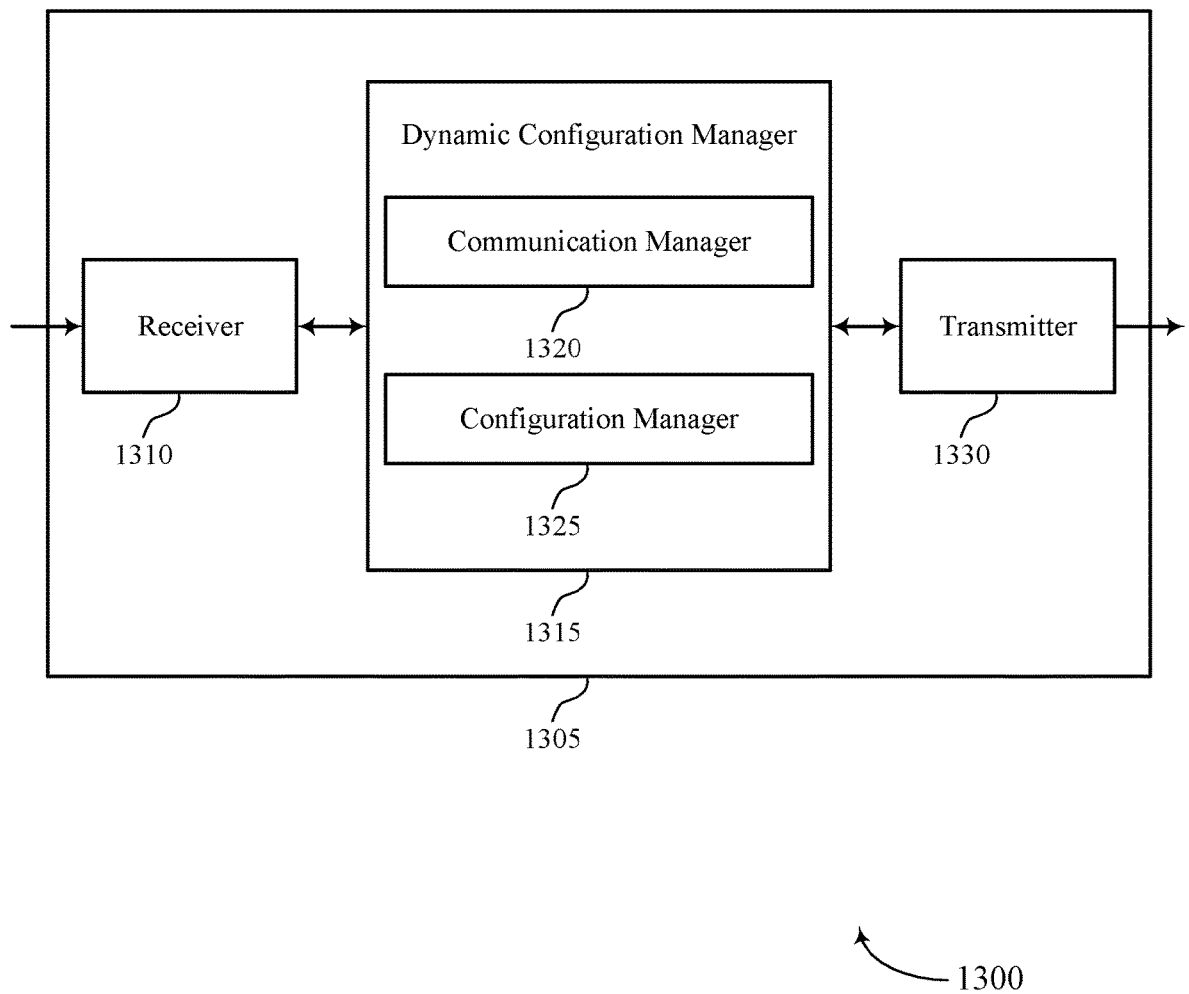

FIG. 13 shows a block diagram 1300 of a device 1305 that supports dynamic configuration and adaptation of physical downlink control channel candidates in accordance with aspects of the present disclosure. The device 1305 may be an example of aspects of a device 1205 or a base station 115 as described herein. The device 1305 may include a receiver 1310, a dynamic configuration manager 1315, and a transmitter 1330. The device 1305 may also include a processor. Each of these components may be in communication with one another (e.g., via one or more buses).

The receiver 1310 may receive information such as packets, user data, or control information associated with various information channels (e.g., control channels, data channels, and information related to dynamic configuration and adaptation of physical downlink control channel candidates, etc.). Information may be passed on to other components of the device 1305. The receiver 1310 may be an example of aspects of the transceiver 1520 described with reference to FIG. 15. The receiver 1310 may utilize a single antenna or a set of antennas.

The dynamic configuration manager 1315 may be an example of aspects of the dynamic configuration manager 1215 as described herein. The dynamic configuration manager 1315 may include a communication manager 1320 and a configuration manager 1325. The dynamic configuration manager 1315 may be an example of aspects of the dynamic configuration manager 1510 described herein.

The communication manager 1320 may transmit, by a base station to a UE, an indication for the UE to monitor an initial set of physical downlink control channel candidates in a first slot and transmit, by the base station, a physical downlink control channel candidate in the initial set that includes an indication of the adjusted set of physical downlink control channel candidates.

The configuration manager 1325 may determine, by the base station, an adjusted set of physical downlink control channel candidates for the UE to monitor in a second slot.

The transmitter 1330 may transmit signals generated by other components of the device 1305. In some examples, the transmitter 1330 may be collocated with a receiver 1310 in a transceiver module. For example, the transmitter 1330 may be an example of aspects of the transceiver 1520 described with reference to FIG. 15. The transmitter 1330 may utilize a single antenna or a set of antennas.

Figure 14:
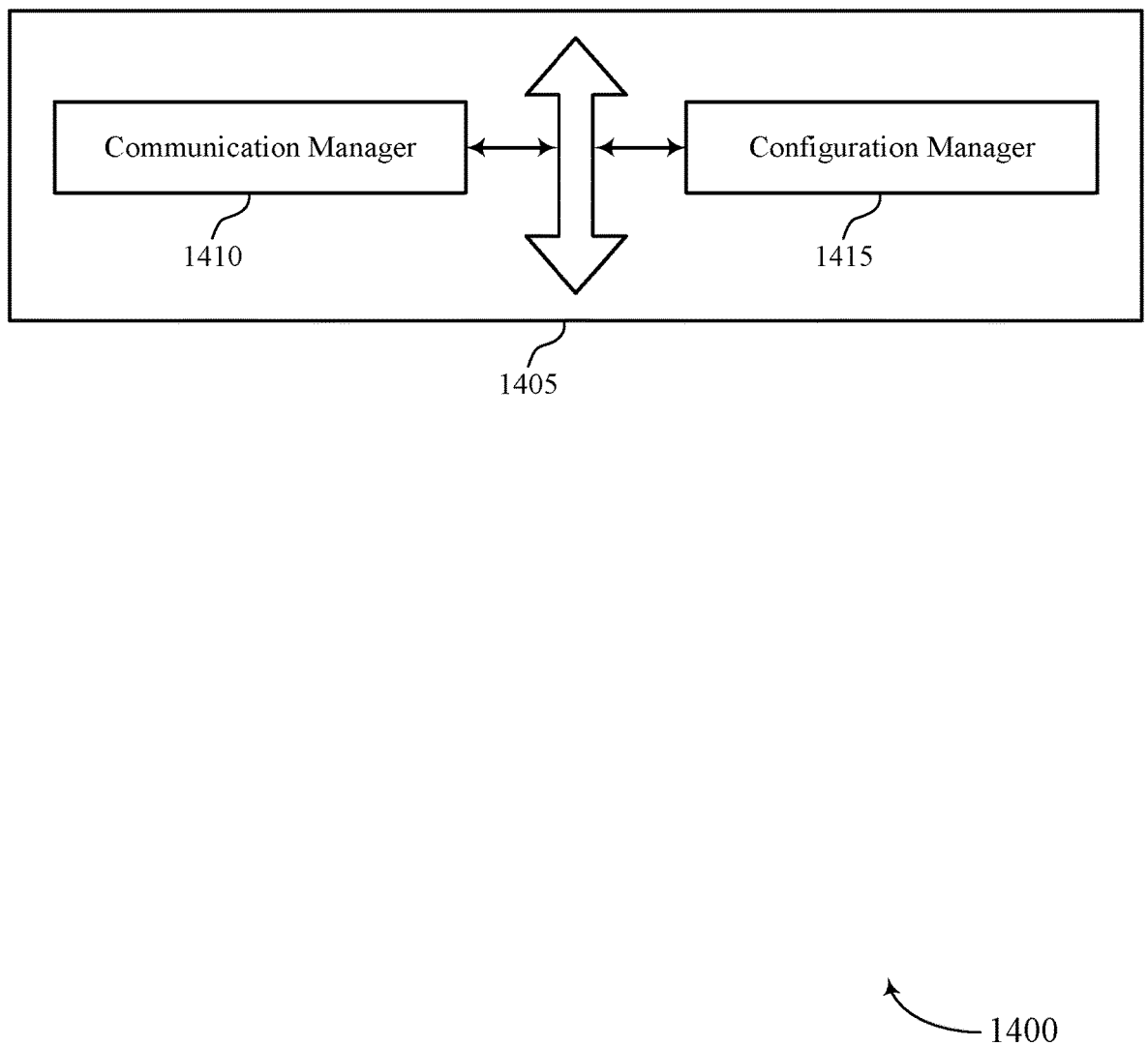
FIG. 14 shows a block diagram of a dynamic configuration manager that supports dynamic configuration and adaptation of physical downlink control channel candidates in accordance with aspects of the present disclosure.

FIG. 14 shows a block diagram 1400 of a dynamic configuration manager 1405 that supports dynamic configuration and adaptation of physical downlink control channel candidates in accordance with aspects of the present disclosure. The dynamic configuration manager 1405 may be an example of aspects of a dynamic configuration manager 1215, a dynamic configuration manager 1315, or a dynamic configuration manager 1510 described herein. The dynamic configuration manager 1405 may include a communication manager 1410 and a configuration manager 1415. Each of these modules may communicate, directly or indirectly, with one another (e.g., via one or more buses).

The communication manager 1410 may transmit, by a base station to a UE, an indication for the UE to monitor an initial set of physical downlink control channel candidates in a first slot. In some examples, transmitting, by the base station, a physical downlink control channel candidate in the initial set that includes an indication of the adjusted set of physical downlink control channel candidates.

In some examples, the communication manager 1410 may transmit the DCI message to the UE via at least one physical downlink control channel candidate in the initial set. In some examples, the communication manager 1410 may transmit the granularity message to the UE via at least one of a RRC message, a media access control element (MAC-CE) message, or a DCI message, or any combination thereof.

The configuration manager 1415 may determine, by the base station, an adjusted set of physical downlink control channel candidates for the UE to monitor in a second slot. In some examples, configuring a DCI message that includes the indication of the adjusted set of physical downlink control channel candidates. In some examples, the configuration manager 1415 may configure a granularity message indicating how to apply the indication of the adjusted set of physical downlink control channel candidates to associated search spaces.

Figure 15:
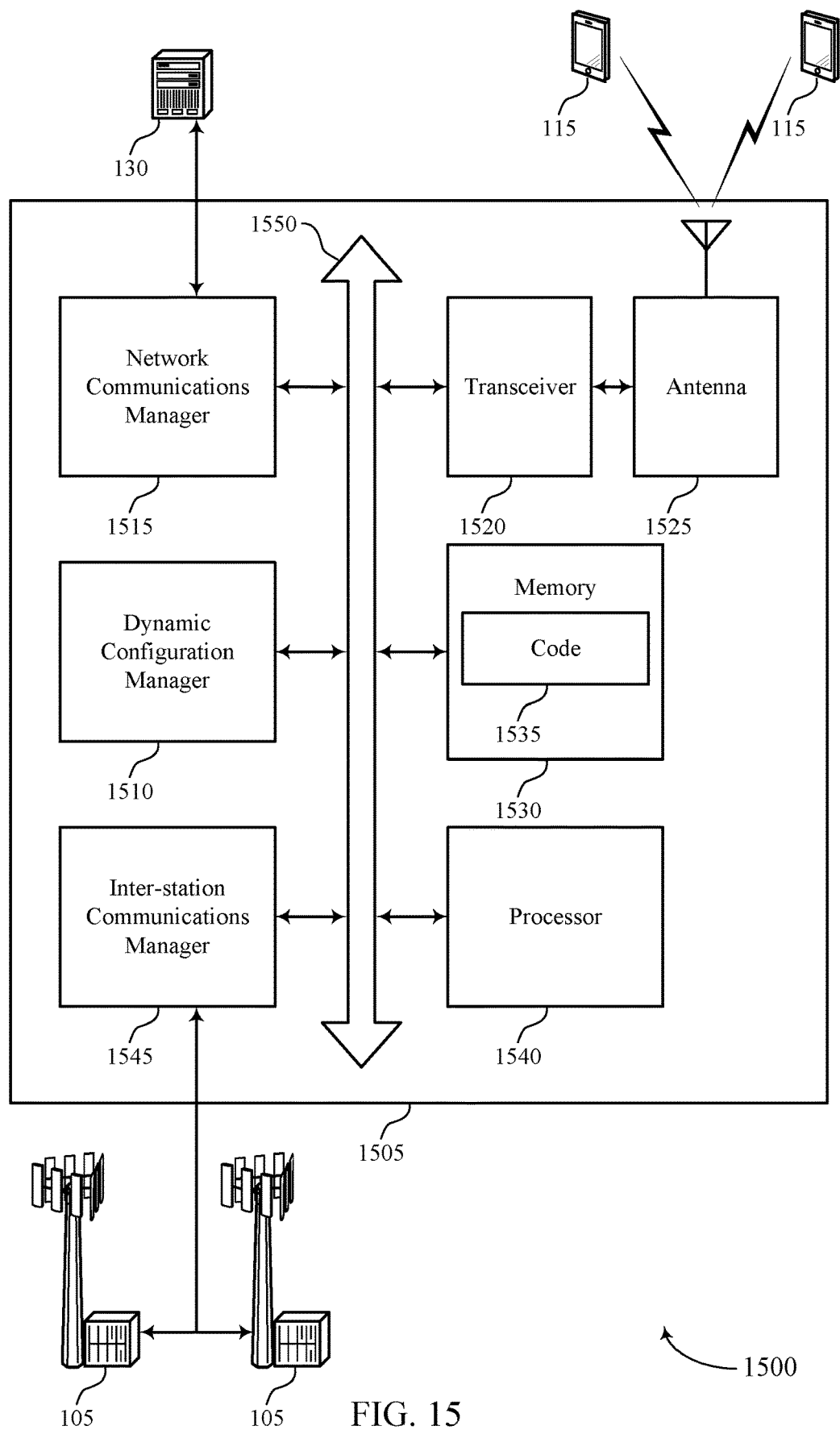
FIG. 15 shows a diagram of a system including a device that supports dynamic configuration and adaptation of physical downlink control channel candidates in accordance with aspects of the present disclosure.

FIG. 15 shows a diagram of a system 1500 including a device 1505 that supports dynamic configuration and adaptation of physical downlink control channel candidates in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a dynamic configuration manager 1510, a network communications manager 1515, a transceiver 1520, an antenna 1525, memory 1530, a processor 1540, and an inter-station communications manager 1545. These components may be in electronic communication via one or more buses (e.g., bus 1550).

The dynamic configuration manager 1510 may transmit, by a base station to a UE, an indication for the UE to monitor an initial set of physical downlink control channel candidates in a first slot, transmit, by the base station, a physical downlink control channel candidate in the initial set that includes an indication of the adjusted set of physical downlink control channel candidates, and determine, by the base station, an adjusted set of physical downlink control channel candidates for the UE to monitor in a second slot.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device #{device} to perform various functions (e.g., functions or tasks supporting dynamic configuration and adaptation of physical downlink control channel candidates).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support configuring physical downlink control channel candidates. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
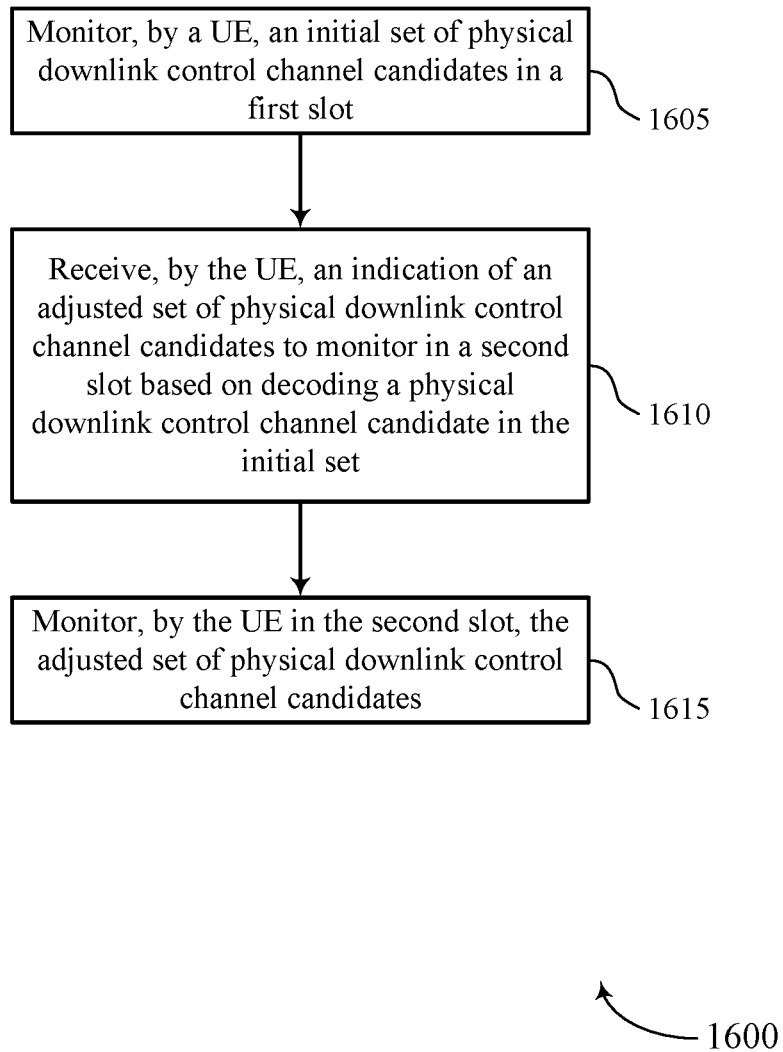
FIGS. 16 through 20 show flowcharts illustrating methods that support dynamic configuration and adaptation of physical downlink control channel candidates in accordance with aspects of the present disclosure.

FIG. 16 shows a flowchart illustrating a method 1600 that supports dynamic configuration and adaptation of physical downlink control channel candidates in accordance with aspects of the present disclosure. The operations of method 1600 may be implemented by a UE 115 or its components as described herein. For example, the operations of method 1600 may be performed by a dynamic configuration manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may monitor, by a UE, an initial set of physical downlink control channel candidates in a first slot. The operations of 1605 may be performed according to the methods described herein. In some examples, aspects of the operations of 1605 may be performed by a monitoring manager as described with reference to FIGS. 8 through 11.

At 1610, the UE may receive, by the UE, an indication of an adjusted set of physical downlink control channel candidates to monitor in a second slot based on decoding a physical downlink control channel candidate in the initial set. The operations of 1610 may be performed according to the methods described herein. In some examples, aspects of the operations of 1610 may be performed by a communication manager as described with reference to FIGS. 8 through 11.

At 1615, the UE may monitor, by the UE in the second slot, the adjusted set of physical downlink control channel candidates. The operations of 1615 may be performed according to the methods described herein. In some examples, aspects of the operations of 1615 may be performed by a monitoring manager as described with reference to FIGS. 8 through 11.

Figure 17:
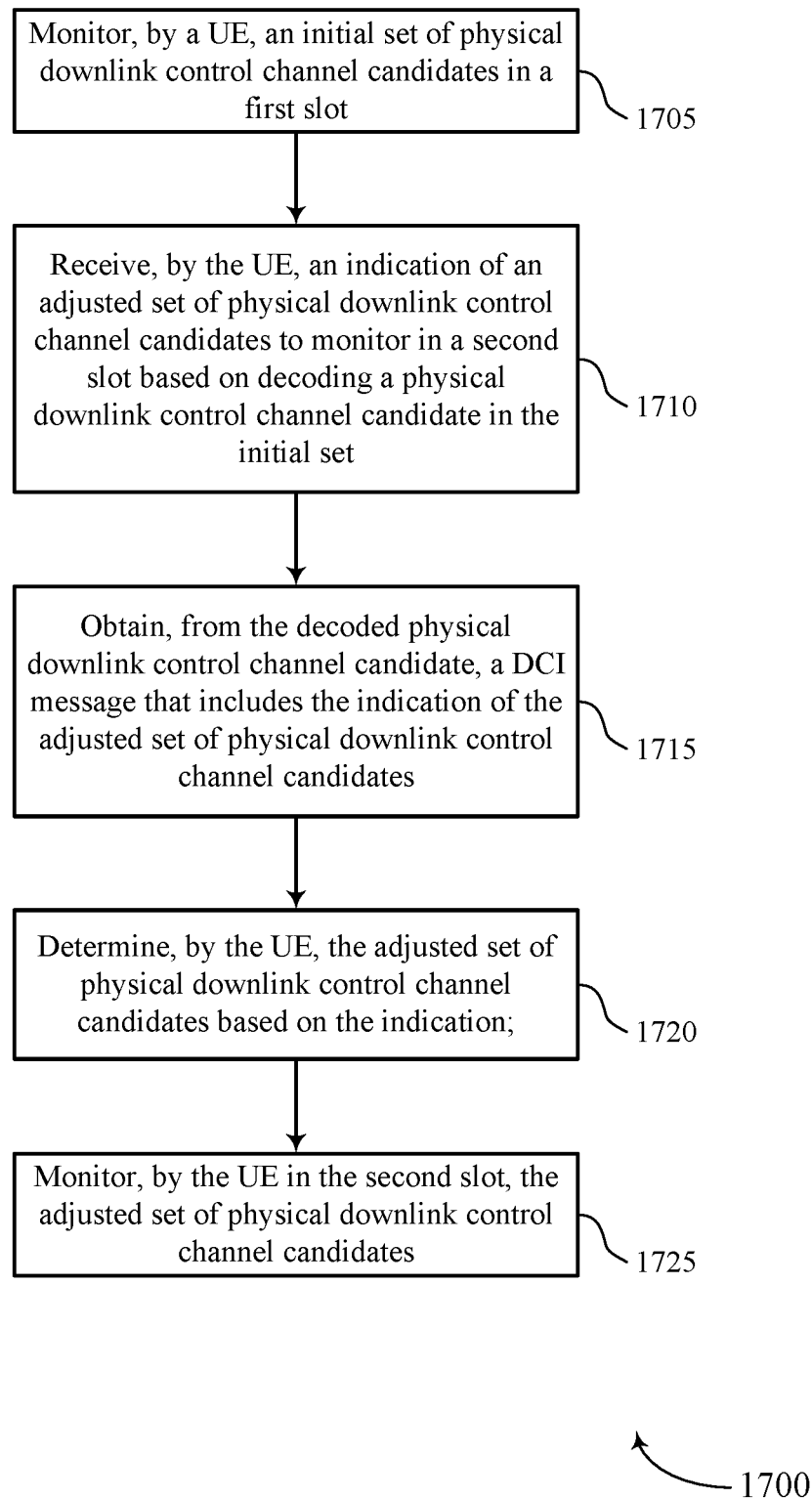

FIG. 17 shows a flowchart illustrating a method 1700 that supports dynamic configuration and adaptation of physical downlink control channel candidates in accordance with aspects of the present disclosure. The operations of method 1700 may be implemented by a UE 115 or its components as described herein. For example, the operations of method 1700 may be performed by a dynamic configuration manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may monitor, by a UE, an initial set of physical downlink control channel candidates in a first slot. The operations of 1705 may be performed according to the methods described herein. In some examples, aspects of the operations of 1705 may be performed by a monitoring manager as described with reference to FIGS. 8 through 11.

At 1710, the UE may receive, by the UE, an indication of an adjusted set of physical downlink control channel candidates to monitor in a second slot based on decoding a physical downlink control channel candidate in the initial set. The operations of 1710 may be performed according to the methods described herein. In some examples, aspects of the operations of 1710 may be performed by a communication manager as described with reference to FIGS. 8 through 11.

At 1715, the UE may obtain, from the decoded physical downlink control channel candidate, a DCI message that includes the indication of the adjusted set of physical downlink control channel candidates. The operations of 1715 may be performed according to the methods described herein. In some examples, aspects of the operations of 1715 may be performed by a decoding manager as described with reference to FIGS. 8 through 11.

At 1720, the UE may determine, by the UE, the adjusted set of physical downlink control channel candidates based on the indication. The operations of 1720 may be performed according to the methods described herein. In some examples, aspects of the operations of 1720 may be performed by a configuration manager as described with reference to FIGS. 8 through 11.

At 1725, the UE may monitor, by the UE in the second slot, the adjusted set of physical downlink control channel candidates. The operations of 1725 may be performed according to the methods described herein. In some examples, aspects of the operations of 1725 may be performed by a monitoring manager as described with reference to FIGS. 8 through 11.

Figure 18:
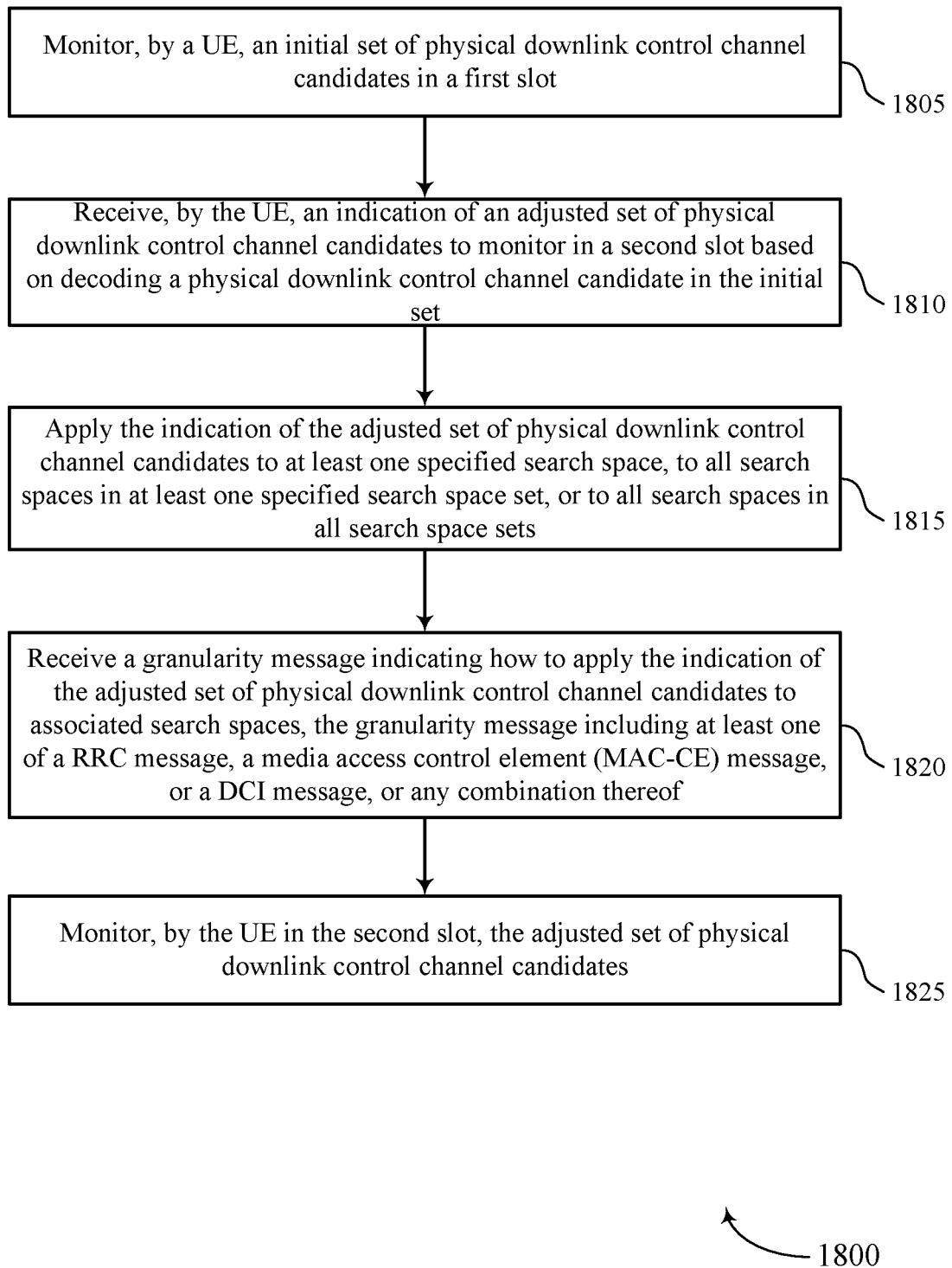

FIG. 18 shows a flowchart illustrating a method 1800 that supports dynamic configuration and adaptation of physical downlink control channel candidates in accordance with aspects of the present disclosure. The operations of method 1800 may be implemented by a UE 115 or its components as described herein. For example, the operations of method 1800 may be performed by a dynamic configuration manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may monitor, by a UE, an initial set of physical downlink control channel candidates in a first slot. The operations of 1805 may be performed according to the methods described herein. In some examples, aspects of the operations of 1805 may be performed by a monitoring manager as described with reference to FIGS. 8 through 11.

At 1810, the UE may receive, by the UE, an indication of an adjusted set of physical downlink control channel candidates to monitor in a second slot based on decoding a physical downlink control channel candidate in the initial set. The operations of 1810 may be performed according to the methods described herein. In some examples, aspects of the operations of 1810 may be performed by a communication manager as described with reference to FIGS. 8 through 11.

At 1815, the UE may apply the indication of the adjusted set of physical downlink control channel candidates to at least one specified search space, to all search spaces in at least one specified search space set, or to all search spaces in all search space sets. The operations of 1815 may be performed according to the methods described herein. In some examples, aspects of the operations of 1815 may be performed by a configuration manager as described with reference to FIGS. 8 through 11.

At 1820, the UE may receive a granularity message indicating how to apply the indication of the adjusted set of physical downlink control channel candidates to associated search spaces, the granularity message including at least one of a RRC message, a media access control element (MAC-CE) message, or a DCI message, or any combination thereof. The operations of 1820 may be performed according to the methods described herein. In some examples, aspects of the operations of 1820 may be performed by a communication manager as described with reference to FIGS. 8 through 11.

At 1825, the UE may monitor, by the UE in the second slot, the adjusted set of physical downlink control channel candidates. The operations of 1825 may be performed according to the methods described herein. In some examples, aspects of the operations of 1825 may be performed by a monitoring manager as described with reference to FIGS. 8 through 11.

Figure 19:
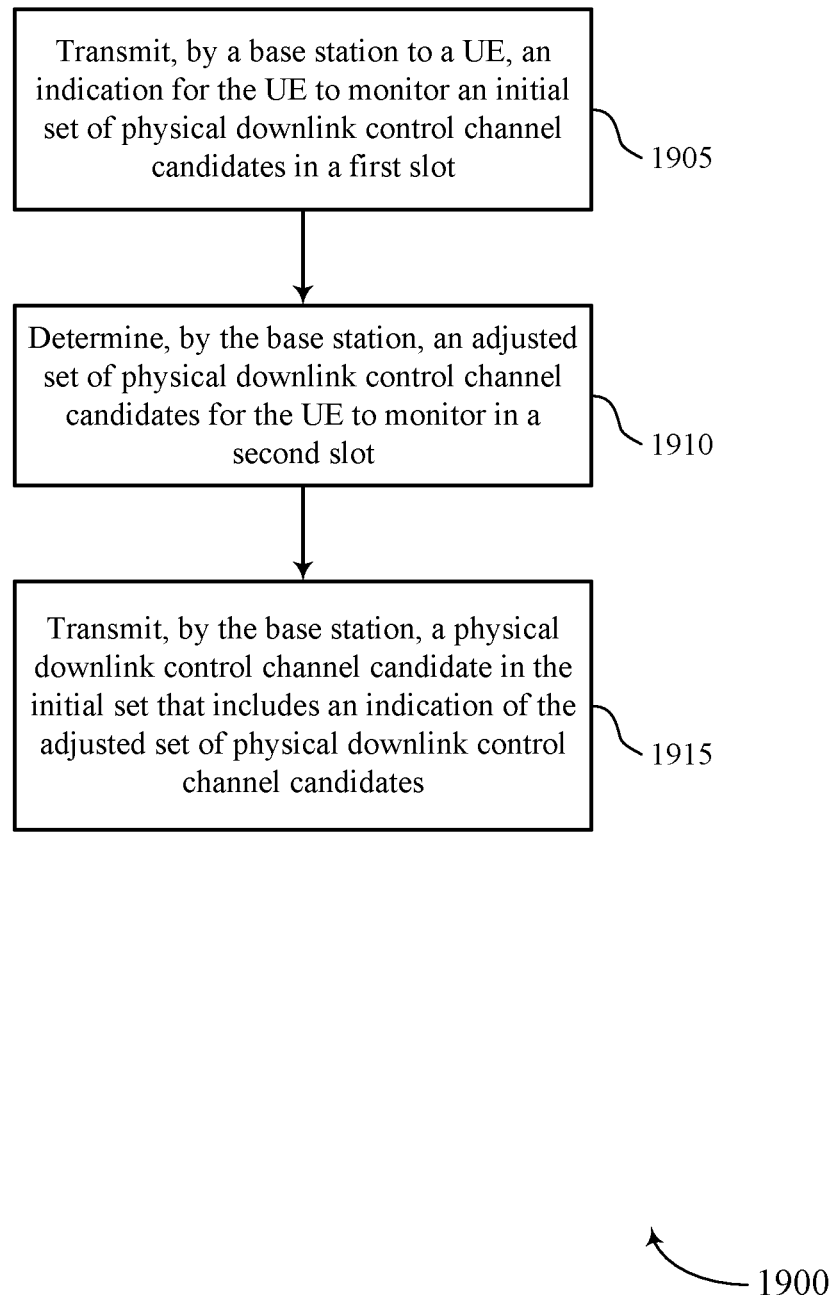

FIG. 19 shows a flowchart illustrating a method 1900 that supports dynamic configuration and adaptation of physical downlink control channel candidates in accordance with aspects of the present disclosure. The operations of method 1900 may be implemented by a base station 105 or its components as described herein. For example, the operations of method 1900 may be performed by a dynamic configuration manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1905, the base station may transmit, by a base station to a UE, an indication for the UE to monitor an initial set of physical downlink control channel candidates in a first slot. The operations of 1905 may be performed according to the methods described herein. In some examples, aspects of the operations of 1905 may be performed by a communication manager as described with reference to FIGS. 12 through 15.

At 1910, the base station may determine, by the base station, an adjusted set of physical downlink control channel candidates for the UE to monitor in a second slot. The operations of 1910 may be performed according to the methods described herein. In some examples, aspects of the operations of 1910 may be performed by a configuration manager as described with reference to FIGS. 12 through 15.

At 1915, the base station may transmit, by the base station, a physical downlink control channel candidate in the initial set that includes an indication of the adjusted set of physical downlink control channel candidates. The operations of 1915 may be performed according to the methods described herein. In some examples, aspects of the operations of 1915 may be performed by a communication manager as described with reference to FIGS. 12 through 15.

Figure 20:
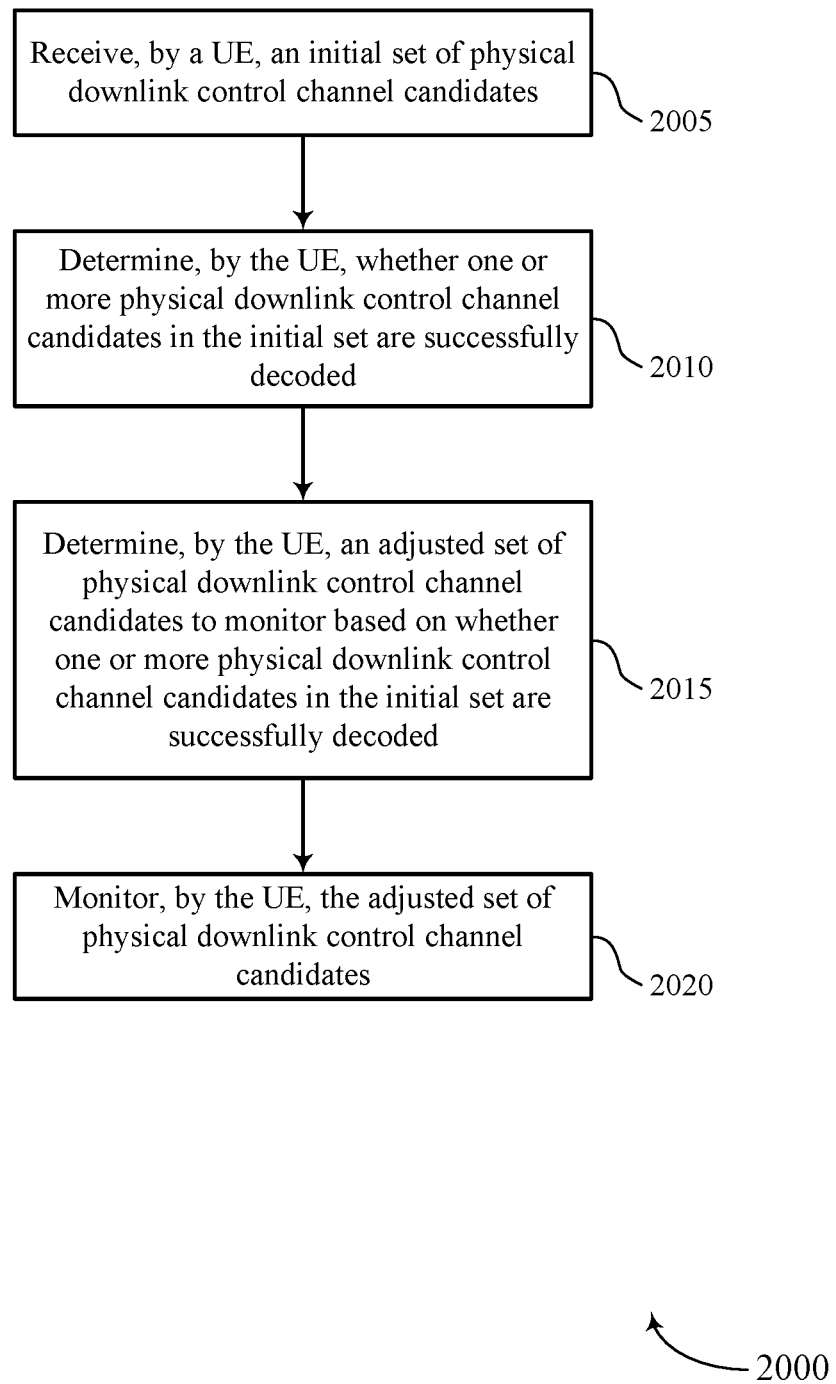

FIG. 20 shows a flowchart illustrating a method 2000 that supports dynamic configuration and adaptation of physical downlink control channel candidates in accordance with aspects of the present disclosure. The operations of method 2000 may be implemented by a UE 115 or its components as described herein. For example, the operations of method 2000 may be performed by a dynamic configuration manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2005, the UE may receive, by a UE, an initial set of physical downlink control channel candidates. The operations of 2005 may be performed according to the methods described herein. In some examples, aspects of the operations of 2005 may be performed by a communication manager as described with reference to FIGS. 8 through 11.

At 2010, the UE may determine, by the UE, whether one or more physical downlink control channel candidates in the initial set are successfully decoded. The operations of 2010 may be performed according to the methods described herein. In some examples, aspects of the operations of 2010 may be performed by a decoding manager as described with reference to FIGS. 8 through 11. In some cases, a base station may invoke (apply) the same one or more rules to determine the adjusted set of physical downlink control candidates monitored by the UE, and therefore the UE and the base station may remain in sync regarding the adjusted set of physical downlink control candidates.

At 2015, the UE may determine, by the UE, an adjusted set of physical downlink control channel candidates to monitor based on whether one or more physical downlink control channel candidates in the initial set are successfully decoded. The operations of 2015 may be performed according to the methods described herein. In some examples, aspects of the operations of 2015 may be performed by a configuration manager as described with reference to FIGS. 8 through 11.

At 2020, the UE may monitor, by the UE, the adjusted set of physical downlink control channel candidates. The operations of 2020 may be performed according to the methods described herein. In some examples, aspects of the operations of 2020 may be performed by a monitoring manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
monitoring, by a user equipment (UE), an initial set of physical downlink control channel candidates in a first slot;
receiving, by the UE, an indication of an adjusted set of physical downlink control channel candidates to monitor in a second slot based at least in part on decoding a physical downlink control channel candidate in the initial set, wherein the decoded physical downlink control channel candidate comprises the indication of the adjusted set of physical downlink control channel candidates;
receiving, by the UE, a granularity message indicating whether to apply the indication of the adjusted set of physical downlink control channel candidates to at least one specified search space, to all search spaces in at least one specified search space set, or to all search spaces in all search space sets; and
monitoring, by the UE in the second slot, the adjusted set of physical downlink control channel candidates based at least in part on the granularity message, wherein the adjusted set of physical downlink control channel candidates to monitor in the second slot comprises at least one of:
a different number of physical downlink control channel candidates than in the first slot; or
a different aggregation level of physical downlink control channel candidates than in the first slot.

2. The method of claim 1, wherein receiving the indication of the adjusted set of physical downlink control channel candidates comprises:
obtaining, by the UE from the decoded physical downlink control channel candidate, a downlink control information (DCI) message that comprises the indication of the adjusted set of physical downlink control channel candidates; and
determining, by the UE, the adjusted set of physical downlink control channel candidates based at least in part on the indication.

3. The method of claim 1, further comprising:
applying the indication of the adjusted set of physical downlink control channel candidates to the at least one specified search space, to all search spaces in the at least one specified search space set, or to all search spaces in all search space sets based at least in part on the granularity message.

4. The method of claim 1, wherein the granularity message comprises at least one of a radio resource control (RRC) message, a media access control element (MAC-CE) message, or a DCI message, or any combination thereof.

5. The method of claim 1, further comprising:
identifying, based at least in part on the indication of the adjusted set of physical downlink control channel candidates, a specific number of physical downlink control channel candidates in the adjusted set of physical downlink control channel candidates, a specific value by which a number of physical downlink control channel candidates is increased or decreased in the adjusted set of physical downlink control channel candidates, or a ratio by which the number of physical downlink control channel candidates is increased or decreased in the adjusted set of physical downlink control channel candidates.

6. The method of claim 5, further comprising:

receiving a candidate adjustment message comprising at least one of a radio resource control (RRC) message, a media access control element (MAC-CE) message, or a downlink control information (DCI) message, or any combination thereof; and determining, based at least in part on the candidate adjustment message, whether to identify the specific number, the specific value, or the ratio by which the number of physical downlink control channel candidates is increased or decreased.

7. The method of claim 1, further comprising:

identifying based at least in part on the indication of the adjusted set of physical downlink control channel candidates, one or more specific aggregation levels to be monitored in the adjusted set of physical downlink control channel candidates, a delta set of aggregation levels indicating one or more aggregation levels to no longer monitor or one or more aggregation levels to begin monitoring, or a step value by which to increment or decrement one or more aggregation levels to be monitored in the adjusted set of physical downlink control channel candidates.

8. The method of claim 7, further comprising:

receiving an aggregation level adjustment message comprising at least one of a radio resource control (RRC) message, a media access control element (MAC-CE) message, or a downlink control information (DCI) message, or any combination thereof; and determining, based at least in part on the aggregation level adjustment message, whether to identify the one or more specific aggregation levels, the delta set of aggregation levels, or the step value.

9. The method of claim 1, wherein the second slot is concurrent with the first slot.

10. The method of claim 1, wherein the second slot and the first slot are consecutive.

11. A method for wireless communication, comprising:

transmitting, by a base station to a user equipment (UE), an indication for the UE to monitor an initial set of physical downlink control channel candidates in a first slot;

determining, by the base station, an adjusted set of physical downlink control channel candidates to monitor in a second slot transmitting, by the base station, a physical downlink control channel candidate in the initial set, wherein the physical downlink control channel candidate comprises an indication of the adjusted set of physical downlink control channel candidates, and wherein the adjusted set of physical downlink control channel candidates to monitor in the second slot comprises at least one of:

a different number of physical downlink control channel candidates than in the first slot; or a different aggregation level of physical downlink control channel candidates than in the first slot; and transmitting, by the base station to the UE, a granularity message indicating whether to apply the indication of the updated set of physical downlink control channel candidates to at least one specified search space, to all search spaces in at least one specified search space set, or to all search spaces in all search space sets.

12. The method of claim 11, wherein transmitting the adjusted set of physical downlink control channel candidates comprises:

configuring a downlink control information (DCI) message that comprises the indication of the adjusted set of physical downlink control channel candidates; and transmitting the DCI message to the UE via at least one physical downlink control channel candidate in the initial set.

13. The method of claim 11, further wherein the indication of the adjusted set of physical downlink control channel candidates indicates a specific number of physical downlink control channel candidates in the adjusted set of physical downlink control channel candidates, a specific value by which a number of physical downlink control channel candidates is increased or decreased in the adjusted set of physical downlink control channel candidates, or a ratio by which the number of physical downlink control channel candidates is increased or decreased in the adjusted set of physical downlink control channel candidates.

14. The method of claim 11, further wherein the indication of the adjusted set of physical downlink control channel candidates indicates one or more specific aggregation levels to be monitored in the adjusted set of physical downlink control channel candidates, a delta set of aggregation levels indicating one or more aggregation levels to no longer monitor or one or more aggregation levels to begin monitoring, or a step value by which to increment or decrement one or more aggregation levels to be monitored in the adjusted set of physical downlink control channel candidates.

15. The method of claim 11, wherein the granularity message is transmitted to the UE via at least one of a radio resource control (RRC) message, a media access control element (MAC-CE) message, or a downlink control information (DCI) message, or any combination thereof.

16. An apparatus for wireless communication, comprising:

a processor, memory coupled to the processor; and instructions stored in the memory and executable by the processor to cause the apparatus to:

monitor, by the apparatus, an initial set of physical downlink control channel candidates in a first slot;

receive, by the apparatus, an indication of an adjusted set of physical downlink control channel candidates to monitor in a second slot based at least in part on decoding a physical downlink control channel candidate in the initial set, wherein the decoded physical downlink control channel candidate comprises the indication of the adjusted set of physical downlink control channel candidates;

receive, by the apparatus, a granularity message indicating whether to apply the indication of the adjusted set of physical downlink control channel candidates to at least one specified search space, to all search spaces in at least one specified search space set, or to all search spaces in all search space sets; and monitor, by the apparatus in the second slot, the adjusted set of physical downlink control channel candidates based at least in part on the granularity message, wherein the adjusted set of physical downlink control channel candidates to monitor in the second slot comprises at least one of:

a different number of physical downlink control channel candidates than in the first slot; or a different aggregation level of physical downlink control channel candidates than in the first slot.

17. The apparatus of claim 16, wherein the instructions stored in the memory and executable by the processor to cause the apparatus to receive the indication of the adjusted set of physical downlink control channel candidates comprise instructions stored in the memory and executable by the processor to cause the apparatus to:
   obtain, by the apparatus from the decoded physical downlink control channel candidate, a downlink control information (DCI) message that comprises the indication of the adjusted set of physical downlink control channel candidates; and
   determine, by the apparatus, the adjusted set of physical downlink control channel candidates based at least in part on the indication.

18. The apparatus of claim 16, further comprising instructions stored in the memory and executable by the processor to cause the apparatus to:
   apply the indication of the adjusted set of physical downlink control channel candidates to the at least one specified search space, to all search spaces in the at least one specified search space set, or to all search spaces in all search space sets based at least in part on the granularity message.

19. The apparatus of claim 16, wherein the granularity message comprises at least one of a radio resource control (RRC) message, a media access control element (MAC-CE) message, or a DCI message, or any combination thereof.

20. The apparatus of claim 16, further comprising instructions stored in the memory and executable by the processor to cause the apparatus to:
   identify, based at least in part on the indication of the adjusted set of physical downlink control channel candidates, a specific number of physical downlink control channel candidates in the adjusted set of physical downlink control channel candidates, a specific value by which a number of physical downlink control channel candidates is increased or decreased in the adjusted set of physical downlink control channel candidates, or a ratio by which the number of physical downlink control channel candidates is increased or decreased in the adjusted set of physical downlink control channel candidates.

21. The apparatus of claim 20, further comprising instructions stored in the memory and executable by the processor to cause the apparatus to:
   receive a candidate adjustment message comprising at least one of a radio resource control (RRC) message, a media access control element (MAC-CE) message, or a downlink control information (DCI) message, or any combination thereof; and
   determine, based at least in part on the candidate adjustment message, whether to identify the specific number, the specific value, or the ratio by which the number of physical downlink control channel candidates is increased or decreased.

22. The apparatus of claim 16, further comprising instructions stored in the memory and executable by the processor to cause the apparatus to:
   identify based at least in part on the indication of the adjusted set of physical downlink control channel candidates, one or more specific aggregation levels to be monitored in the adjusted set of physical downlink control channel candidates, a delta set of aggregation levels indicating one or more aggregation levels to no longer monitor or one or more aggregation levels to begin monitoring, or a step value by which to increment or decrement one or more aggregation levels to be monitored in the adjusted set of physical downlink control channel candidates.

23. The apparatus of claim 22, further comprising instructions stored in the memory and executable by the processor to cause the apparatus to:
   receive an aggregation level adjustment message comprising at least one of a radio resource control (RRC) message, a media access control element (MAC-CE) message, or a downlink control information (DCI) message, or any combination thereof; and
   determine, based at least in part on the aggregation level adjustment message, whether to identify the one or more specific aggregation levels, the delta set of aggregation levels, or the step value.

24. The apparatus of claim 16, wherein the second slot is concurrent with the first slot.

25. An apparatus for wireless communication, comprising:
   a processor,
   memory coupled to the processor; and
   instructions stored in the memory and executable by the processor to cause the apparatus to:
      transmit, by a base station to a user equipment (UE), an indication for the apparatus to monitor an initial set of physical downlink control channel candidates in a first slot;
      determine, by the base station, an adjusted set of physical downlink control channel candidates to monitor in a second slot
      transmit, by the base station, a physical downlink control channel candidate in the initial set that, wherein the physical downlink control channel candidate comprises an indication of the adjusted set of physical downlink control channel candidates, and wherein the adjusted set of physical downlink control channel candidates to monitor in the second slot comprises at least one of:
         a different number of physical downlink control channel candidates than in the first slot; or
         a different aggregation level of physical downlink control channel candidates than in the first slot; and
      transmit, by the base station to the UE, a granularity message indicating whether to apply the indication of the updated set of physical downlink control channel candidates to at least one specified search space, to all search spaces in at least one specified search space set, or to all search spaces in all search space sets.

26. The apparatus of claim 25, wherein the instructions stored in the memory and executable by the processor to cause the apparatus to transmit the adjusted set of physical downlink control channel candidates comprise instructions stored in the memory and executable by the processor to cause the apparatus to:
   configure a downlink control information (DCI) message that comprises the indication of the adjusted set of physical downlink control channel candidates; and
   transmit the DCI message to the apparatus via at least one physical downlink control channel candidate in the initial set.

27. The apparatus of claim 25, further wherein the indication of the adjusted set of physical downlink control channel candidates indicates a specific number of physical downlink control channel candidates in the adjusted set of physical downlink control channel candidates, a specific value by which a number of physical downlink control channel candidates is increased or decreased in the adjusted set of physical downlink control channel candidates, or a ratio by which the number of physical downlink control channel candidates is increased or decreased in the adjusted set of physical downlink control channel candidates.

28. The apparatus of claim 25, further wherein the indication of the adjusted set of physical downlink control channel candidates indicates one or more specific aggregation levels to be monitored in the adjusted set of physical downlink control channel candidates, a delta set of aggregation levels indicating one or more aggregation levels to no longer monitor or one or more aggregation levels to begin monitoring, or a step value by which to increment or decrement one or more aggregation levels to be monitored in the adjusted set of physical downlink control channel candidates.

29. The apparatus of claim 25, wherein the granularity message is transmitted to the apparatus via at least one of a radio resource control (RRC) message, a media access control element (MAC-CE) message, or a downlink control information (DCI) message, or any combination thereof.

* * * * *